(12) United States Patent
Huang et al.

(10) Patent No.: US 12,437,363 B2
(45) Date of Patent: Oct. 7, 2025

(54) METHODS FOR HIGH SPATIAL AND TEMPORAL RESOLUTION ULTRASOUND IMAGING OF MICROVESSELS

(71) Applicant: Mayo Foundation for Medical Education and Research, Rochester, MN (US)

(72) Inventors: Chengwu Huang, Rochester, MN (US); Shigao Chen, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 834 days.

(21) Appl. No.: 17/634,769

(22) PCT Filed: Jun. 15, 2021

(86) PCT No.: PCT/US2021/037464
§ 371 (c)(1),
(2) Date: Feb. 11, 2022

(87) PCT Pub. No.: WO2021/257589
PCT Pub. Date: Dec. 23, 2021

(65) Prior Publication Data
US 2022/0292637 A1    Sep. 15, 2022

Related U.S. Application Data

(60) Provisional application No. 63/039,549, filed on Jun. 16, 2020.

(51) Int. Cl.
*G06T 3/4053* (2024.01)
*A61B 8/00* (2006.01)
(Continued)

(52) U.S. Cl.
CPC .............. *G06T 3/4053* (2013.01); *A61B 8/06* (2013.01); *A61B 8/0891* (2013.01); *A61B 8/469* (2013.01);
(Continued)

(58) Field of Classification Search
CPC ....... G06T 3/4053; G06T 3/4007; A61B 8/06; A61B 8/0891; A61B 8/469; A61B 8/481;
(Continued)

(56) References Cited

U.S. PATENT DOCUMENTS 10,247,824 B2   4/2019   Park et al.
11,589,840 B2   2/2023   Song et al.
(Continued)

FOREIGN PATENT DOCUMENTS

JP   2018015155 A   2/2018
JP   2019202144 A   11/2019

OTHER PUBLICATIONS

Bar-Zion, Á. et al., "SUSHI: Sparsity-Based Ultrasound Super-Resolution Hemodynamic Imaging", IEEE Transactions on Ultrasonics, Ferroelectrics, and Frequency Control, vol. 65, No. 12, Dec. 2018, p. 2365-2380.
(Continued)

*Primary Examiner* — Benjamin O Dulaney
(74) *Attorney, Agent, or Firm* — Quarles & Brady LLP

(57) ABSTRACT

Systems and methods for high spatial and temporal resolution ultrasound imaging of microvessels in a subject are described. Ultrasound data are acquired from a region-of-interest in a subject who has been administered a microbubble contrast agent. The ultrasound data are acquired while the microbubbles are moving through, or otherwise present in, the region-of-interest. The region-of-interest may include, for instance, microvessels or other microvasculature in the subject. By imaging microbubbles,
(Continued)

a cross-correlation map between each microbubble image and a point spread function of the system can be generated. Accumulation of power-based cross-correlation maps may then be used to generate a high-resolution high-contrast image of the microvasculature.

21 Claims, 17 Drawing Sheets

(51) Int. Cl.
*A61B 8/06* (2006.01)
*A61B 8/08* (2006.01)
*G01S 7/52* (2006.01)
*G01S 15/89* (2006.01)
*G06T 3/4007* (2024.01)

(52) U.S. Cl.
CPC ............ *A61B 8/481* (2013.01); *A61B 8/5207* (2013.01); *A61B 8/5269* (2013.01); *G01S 7/52039* (2013.01); *G01S 15/8977* (2013.01); *G06T 3/4007* (2013.01)

(58) Field of Classification Search
CPC ..... A61B 8/5207; A61B 8/5269; A61B 8/463; A61B 8/467; A61B 8/5215; G01S 7/52039; G01S 15/8977
See application file for complete search history.

(56) References Cited

U.S. PATENT DOCUMENTS

| | | | |
|---|---|---|---|
| 2018/0060635 A1 | 3/2018 | Li et al. | |
| 2018/0220997 A1 | 8/2018 | Song et al. | |
| 2019/0053780 A1 | 2/2019 | Song et al. | |
| 2019/0223828 A1 | 7/2019 | Torp et al. | |
| 2019/0365355 A1 | 12/2019 | Eldar et al. | |
| 2020/0178939 A1* | 6/2020 | Song | A61B 8/5223 |
| 2022/0240899 A1 | 8/2022 | Trzasko et al. | |
| 2023/0086332 A1 | 3/2023 | Huang et al. | |

OTHER PUBLICATIONS

Song, P. et al., "Improved Super-Resolution Ultrasound Microvessel Imaging with Spatiotemporal Nonlocal Means Filtering and BIpartite Graph-Based Microbubble Tracking", IEEE Transactions on Ultrasoncs, Ferroelectrics, and Frequency Control, vol. 65, No. 2, Feb. 2019, p. 149-167.
Bar-Zion, A. et al., "Fast Vascular Ultrasound Imaging with Enhanced Spatial Resolution and Background Rejection", IEEE Transactions on Medical Imaging, vol. 36, No. 1, Jan. 2017, p. 169-179.
Chaigne, T. et al., "Super-resolution photoacoustic imaging via flow induced absorption fluctuations", Arxiv.org, May 30, 2017, p. 1-6.
Bai, C. et al., "Design and Characterization of an Acoustically and Structurally Matched 3-D-Printed Model for Transcranial Ultrasound Imaging", IEEE Transactions on Ultrasonics, Ferroelectrics, and Frequency Control, vol. 65, No. 5, May 2018, p. 741-748.
Errico, C. et al., "Ultrafast ultrasound localizatoin microscopy for deep super-resolution vascular imaging", Nature, vol. 527, Nov. 26, 2015, p. 499-502.
Guo, W. et al., "A High-Efficiency Super-Resolution Reconstruction Method for Ultrasound Microvascular Imaging", Appl. Sci. 2018, 8, 1143, p. 1-12.
Christensen-Jeffries, K. et al., "In Vivo Acoustic Super-Resolution and Super-Resolved Velocity Mapping Using Microbubbles", IEEE Transactions on Medical Imaging, 2014, 34(2), 433-440.
Lin, F. et al., "3-D Ultrasound Localization Microscopy for Identifying Microvascular Morphology Features of Tumor Angiogenesis at a Resolution Beyond the Diffraction Limit of Conventional Ultrasound", Theranostics, 2017; 7(1): 196-204.
Lowerison, M. et al., "Ultrasound localization microscopy of renal tumor xenografts in chicken embryo is correlated to hypoxia", Scientific Reports, (2020) 10:2478.
Dertinger, T., et al., "Fast, background-free, 3D super-resolution optical fluctuation imaging (SOFI)", PNAS, Dec. 29, 2009, vol. 106, No. 52, 22287-22292.
Dertinger, T., et al., Achieving increased resolution and more pixels with Superresolution Optical Fluctuation Imaging (SOFI), Optics Express, Aug. 30, 2010, vol. 18, No. 18, 18875-18885.
Foiret, J., et al., "Ultrasound localization microscopy to image and assess microvasculature in a rat kidney", Sci Rep 7, 13662 (2017).
Yu, J., et al., "Super-resolution ultrasound imaging method for microvasculature in vivo with a high temporal accuracy", Sci Rep, 8:13918 (2018).

* cited by examiner

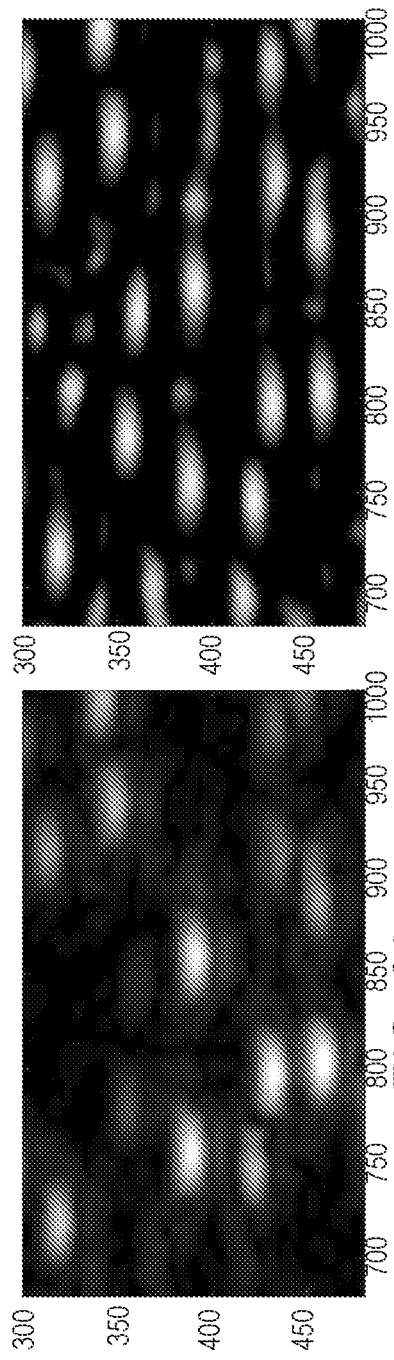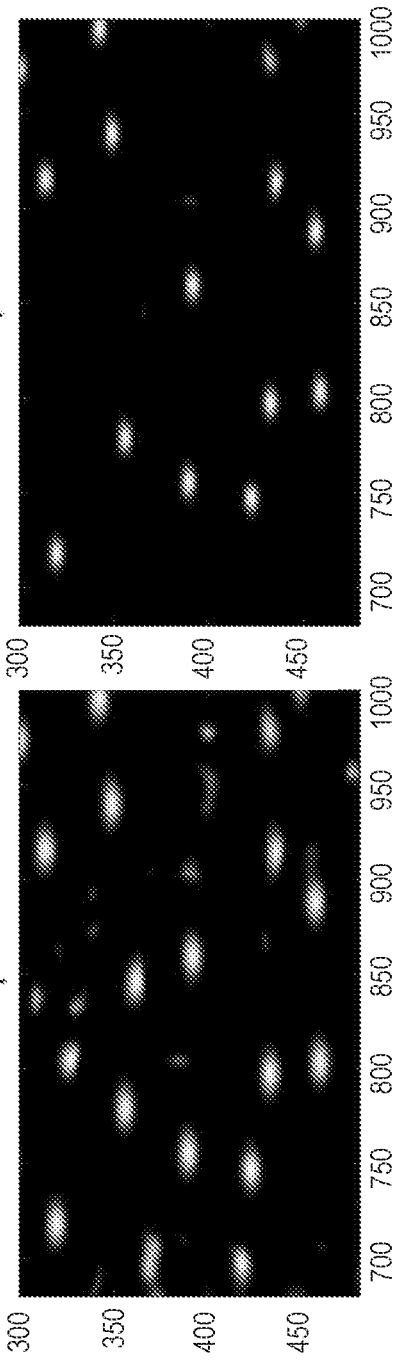
FIG. 6A Original MB ultrasound image
FIG. 6B 1st power based cross-correlation map
FIG. 6C 4th power based cross-correlation map
FIG. 6D 8th power based cross-correlation map

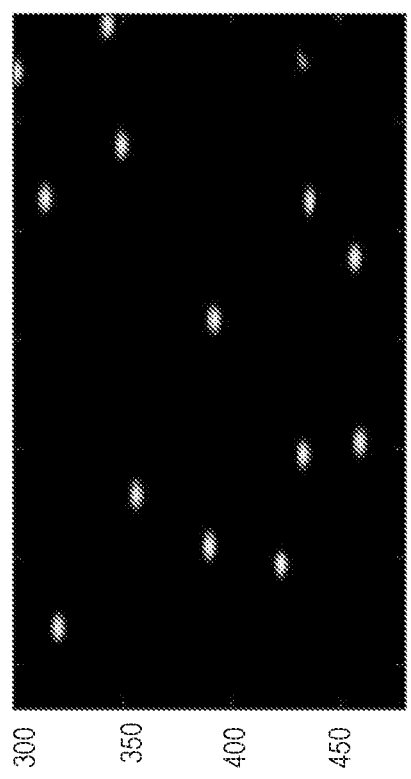
FIG. 7A Threshold = 0
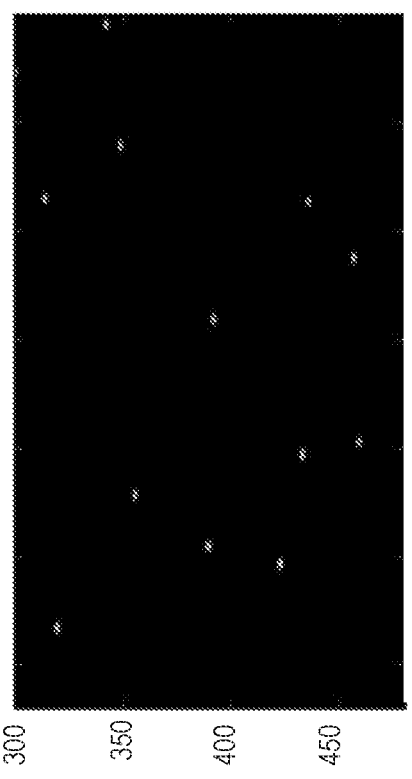
FIG. 7B Threshold = 0.25
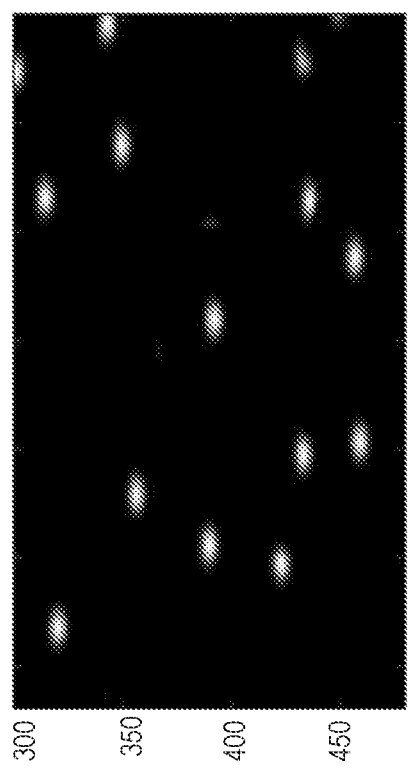
FIG. 7C Threshold = 0.5
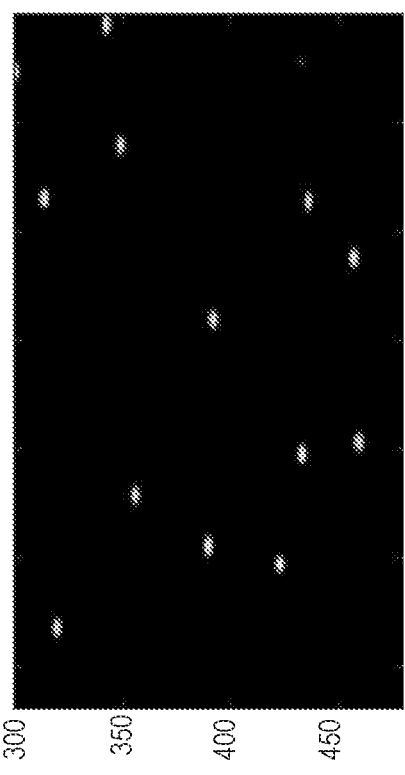
FIG. 7D Threshold = 0.75

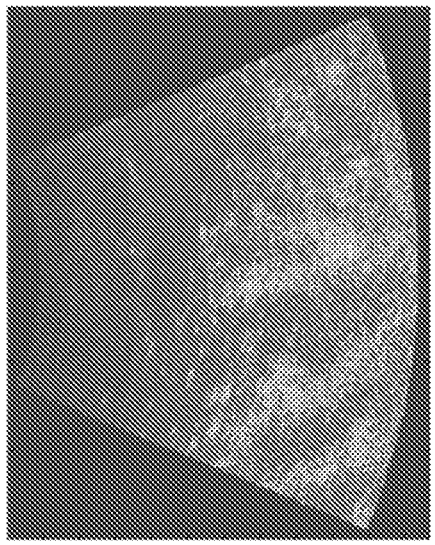
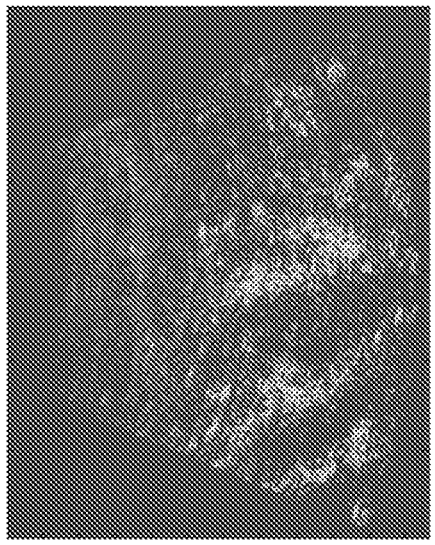
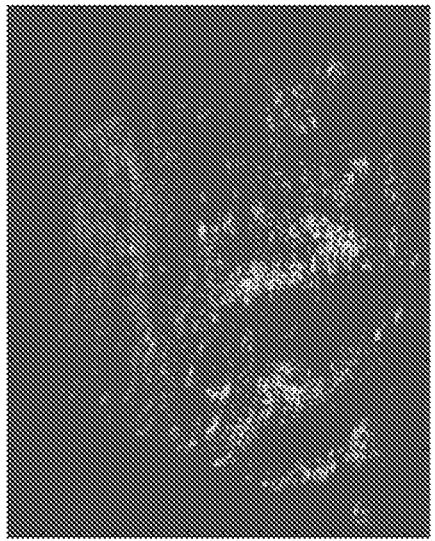
FIG. 12A Original MB image
FIG. 12B Experimental measured noise floor
FIG. 12C Spatial-dependent noise thresholding α = 3
FIG. 12D Spatial-dependent noise thresholding α = 5

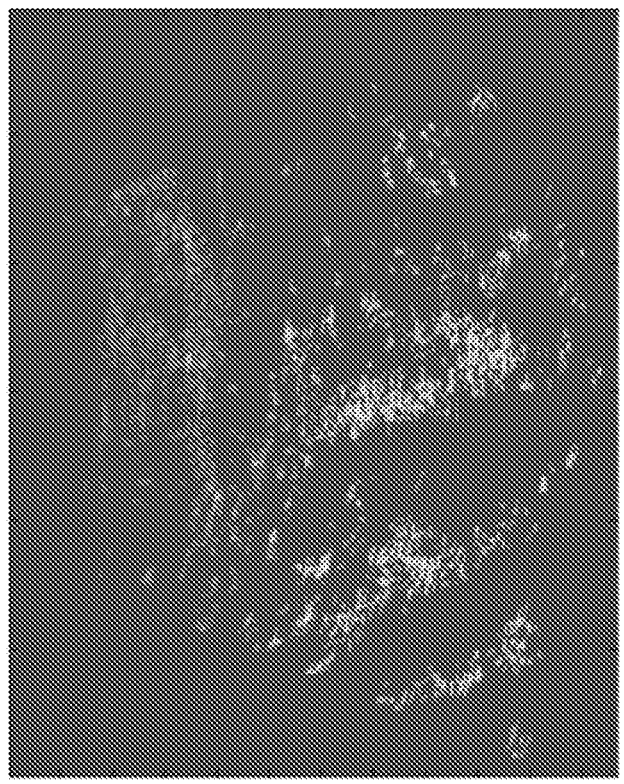
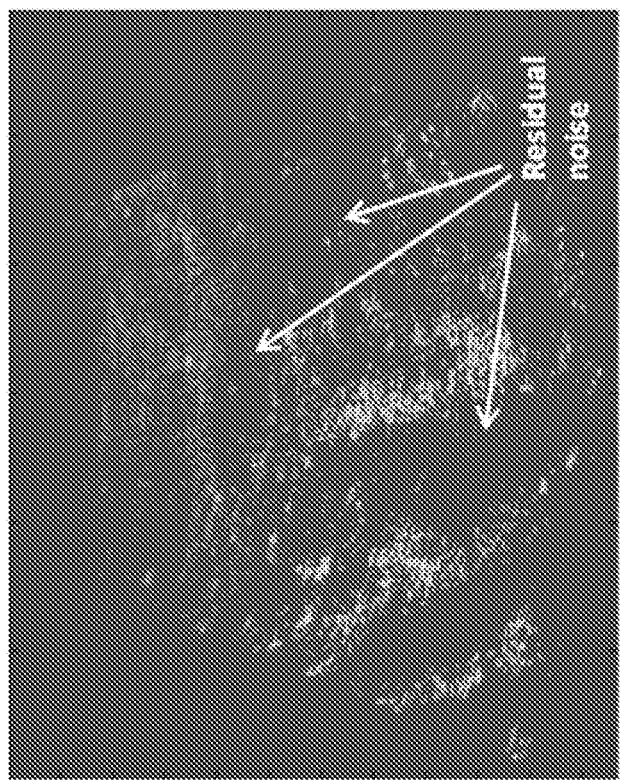
FIG. 12E
FIG. 12F

METHODS FOR HIGH SPATIAL AND TEMPORAL RESOLUTION ULTRASOUND IMAGING OF MICROVESSELS

CROSS-REFERENCE TO RELATED APPLICATIONS

This application represents the national stage entry of PCT/US2021/037464 filed on Jun. 15, 2021 and claims the benefit of U.S. Provisional Patent Application Ser. No. 63/039,549 filed on Jun. 16, 2020 and entitled "Methods for High Spatial and Temporal Resolution Ultrasound Imaging of Microvessels," the contents of which is incorporated herein by reference as if set forth in its entirety for all purposes.

STATEMENT REGARDING FEDERALLY SPONSORED RESEARCH

This invention was made with government support under NS111039 awarded by the National Institutes of Health. The government has certain rights in the invention.

BACKGROUND

Ultrasound contrast microbubbles are routinely used in clinic for ultrasound imaging enhancement. The typical size of a microbubble ranges between 1-5 µm, which is much smaller than the wavelength of ultrasound, which is typically on the order of 100-800 µm. As a result, single microbubbles appear as blurred point sources with a similar size as the ultrasound wavelength. Also, microbubbles that are less than half an ultrasound wavelength apart cannot be resolved individually, a consequence that is referred to as the diffraction limit of ultrasound.

Contrast-enhanced ultrasound (CEUS) imaging is now widely and routinely used in clinical practice for providing highly sensitive blood flow and perfusion imaging in either shallow and deep tissues with a very high temporal resolution (real-time). While the CEUS can provide a quantitative assessment of relative blood volume and tissue perfusion, it is still limited by its spatial resolution that microvasculature structure can hardly be identified. Imaging of the vessel structures and blood flow hemodynamics at the microvessel or capillary level (such as smaller than 100 micrometers) is clinically desirable because many pathological changes of tissue are happening at a small vessel level, such as a tumor.

Super-resolution ultrasound techniques have been disclosed previously and are capable of imaging microvasculature structure beyond the ultrasound diffraction limit, based on pinpoint localization of individual microbubbles (MBs) and tracking the movement of MB positions. Despite improved spatial resolution, a significant challenge remains with poor temporal resolution where a microvasculature image may need to be generated with tens of seconds of data acquisition, which severely hurdle the clinical translation of the technique. Clinically relevant acquisition times may be on the order of 1 or 2 seconds. Super-resolution techniques may not be able to provide fully populated vessel lumen images in this time frame, and forcing such a technique to do so may deteriorate the visualization of the microvasculature. Moreover, super-resolution approaches typically rely on complicated localization, MB pairing, and tracking algorithms that involve a high computational cost.

Therefore, there remains a need for a high-definition ultrasound microvessel imaging technique that can achieve both high spatial and temporal resolution at the same time. Image generation within a very short period of time is also needed that may be similar to clinical CEUS protocols.

SUMMARY OF THE DISCLOSURE

The present disclosure addresses the aforementioned drawbacks by providing a method for high spatial and temporal resolution imaging of microvessels using an ultrasound system. Ultrasound data may be accessed from an image storage system or otherwise acquired from a region-of-interest in a subject who has been administered a microbubble contrast agent. The ultrasound data are acquired while the microbubbles are moving through, or otherwise present in, the region-of-interest. The region-of-interest may include, for instance, microvessels or other microvasculature in the subject. A cross-correlation map between each microbubble image and a point spread function of the system may be used to generate a high-resolution, high-contrast image of the microvasculature. A velocity estimation may also be performed from determined microbubble trajectories determined between frames of the cross-correlation map.

In one configuration, a method is provided for high-spatial and temporal resolution imaging of microvessels using an ultrasound system. The steps of the method include accessing ultrasound data with a computer system, where the ultrasound data were acquired with the ultrasound system from a region-of-interest in a subject in which a microbubble contrast agent was present when the ultrasound data were acquired. The method also includes generating microbubble signal data with the computer system by separating microbubble signals in the ultrasound data from other signals in the ultrasound data. The method also includes determining a point spread function (PSF) for the ultrasound system used to acquire the ultrasound data and generating a cross-correlation map between the microbubble signal data and the point spread function of the ultrasound system. A high spatial and temporal resolution microvessel image may be produced based at least in part on the generated cross-correlation map.

In one configuration, an ultrasound system for high-spatial and temporal resolution imaging of microvessels is provided. The system includes a computer system configured to access ultrasound data with a computer system, where the ultrasound data were acquired with the ultrasound system from a region-of-interest in a subject in which a microbubble contrast agent was present when the ultrasound data were acquired. The computer system is also configured to generate microbubble signal data with the computer system by separating microbubble signals in the ultrasound data from other signals in the ultrasound data. The computer system is also configured to determine a point spread function (PSF) for the ultrasound system used to acquire the ultrasound data and generate a cross-correlation map between the microbubble signal data and the point spread function of the ultrasound system. A high spatial and temporal resolution microvessel image may be produced by the computer system based at least in part on the generated cross-correlation map.

In one configuration, a method is provided for high-spatial and temporal resolution imaging of microvessels using an ultrasound system. The method includes accessing ultrasound data with a computer system, which have been acquired with the ultrasound system from a region-of-interest in a subject in which a microbubble contrast agent was present when the ultrasound data were acquired. The method also includes generating microbubble signal data with the computer system by separating microbubble signals in the ultrasound data from other signals in the ultrasound data and isolating individual microbubble trajectories in the microbubble signal data. The method also includes determining trajectory parameters of the isolated microbubble trajectories and estimating microbubble flow velocity based upon the determined trajectory parameters of the isolated microbubble trajectories. A high spatial and temporal resolution microvessel image may be produced based at least in part on the estimated microbubble flow velocity.

The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention.

BRIEF DESCRIPTION OF THE DRAWINGS

FIG. 6A is an image of non-limiting example original MB ultrasound image data.

FIG. 6B is an image of a non-limiting example $1^{st}$ power based cross-correlation map of FIG. 6A.

FIG. 6C is an image of a non-limiting example $4^{th}$ power based cross-correlation map of FIG. 6A.

FIG. 6D is an image of a non-limiting example $8^{th}$ power based cross-correlation map of FIG. 6A.

FIG. 7A is a non-limiting example of an image without threshold sharpening of the cross-correlation.

FIG. 7B is a non-limiting example of an image with threshold sharpening of the cross-correlation set to 0.25.

FIG. 7C is a non-limiting example of an image with threshold sharpening of the cross-correlation set to 0.5

FIG. 7D is a non-limiting example of an image with threshold sharpening of the cross-correlation set to 0.75

FIG. 12A is an original MB image of a non-limiting example spatial-dependent thresholding method based on noise floor estimation.

FIG. 12B is a non-limiting example measured noise floor image of a non-limiting example spatial-dependent thresholding method based on noise floor estimation.

FIG. 12C is a non-limiting example noise floor image of a non-limiting example spatial-dependent thresholding method based on noise floor estimation.

FIG. 12D is another non-limiting example noise floor image of a non-limiting example spatial-dependent thresholding method based on noise floor estimation.

FIG. 12E is a non-limiting example image before residual noise suppression.

FIG. 12F is a non-limiting example image after residual noise suppression.

DETAILED DESCRIPTION

Described here are systems and methods for high spatial and temporal resolution ultrasound imaging of microvessels in a subject. High-definition microvessel imaging in a subject may be used to image microvasculature in a high resolution and contrast-to-noise ratio (CNR). Conventional ultrasound imaging and CEUS imaging generally displays the image as signal intensities. In accordance with the present disclosure, high spatial and temporal resolution ultrasound imaging techniques may utilize correlation maps to generate images with substantially improved spatial resolution and CNR. Ultrasound data are acquired from a region-of-interest in a subject who has been administered a microbubble contrast agent. The ultrasound data are acquired while the microbubbles are moving through, or otherwise present in, the region-of-interest. The region-of-interest may include, for instance, microvessels or other microvasculature in the subject. By imaging microbubbles (MB), a cross-correlation map between each MB image and a point spread function (PSF) of the system can be generated. Accumulation of the power-based cross-correlation maps over a certain number of frames can then generate a high-resolution high-contrast image of the microvasculature, as described in the present disclosure.

Figure 1:
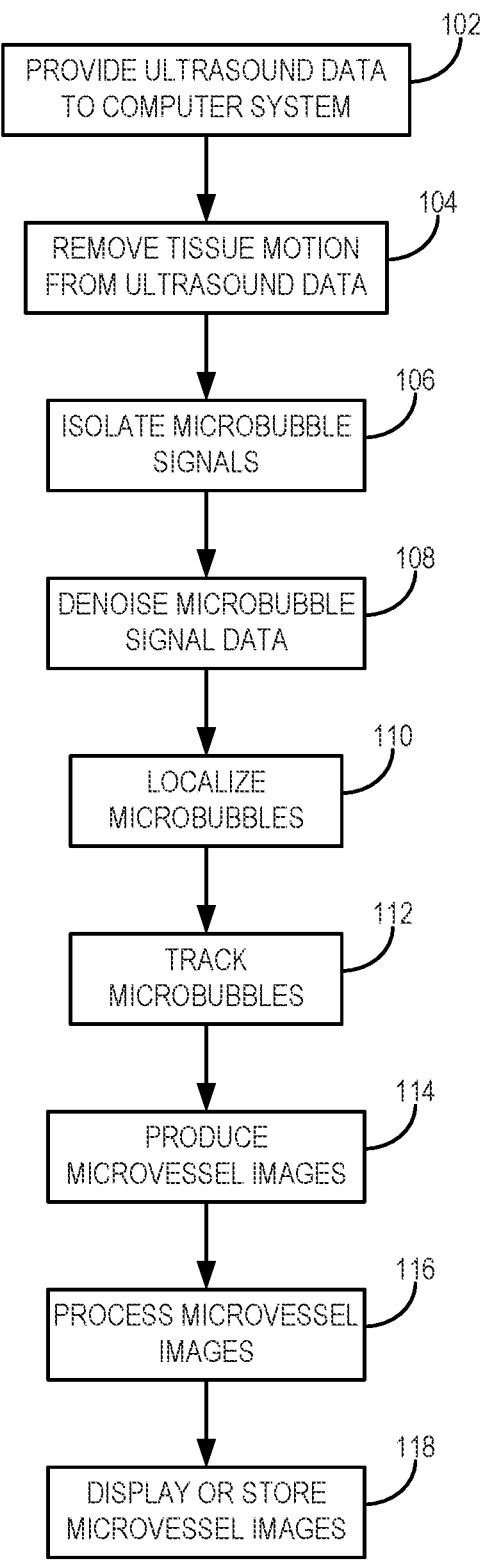
FIG. 1 is a flowchart setting forth the steps of an example method for producing super-resolution images of a microvessel with an ultrasound system.

Referring now to FIG. 1, a flowchart is illustrated as setting forth the steps of an example method for using an ultrasound system to produce super-resolution images of microvessels in a subject who has been administered a microbubble contrast agent, such that disclosed in U.S.

patent application Ser. No. 16/617,628, which is hereby incorporated by reference. In general, high resolution or super-resolution refers to a resolution that is enhanced relative to the resolution attainable with the imaging system. For instance, high resolution or super-resolution ultrasound images can refer to images with resolution that is finer than the diffraction limit.

The method includes providing ultrasound data to a computer system, as indicated at step 102. Tissue motion may be removed from the ultrasound data at step 104. Microbubble signals may be isolated at step 106. Denoising of the microbubble signal data may be performed at step 108. In some configurations, microbubbles may be localized at step 110 and tracked at step 112, such as following the velocity estimation methods of FIG. 11F described below. Microvessel images may be produced at step 114, processed at step 116, and displayed or stored at step 118.

In some embodiments, providing the ultrasound data to the computer system can include retrieving previously acquired ultrasound data from a memory or other data storage, which may be a part of or separate from the computer system. In some other embodiments, providing the ultrasound data can include acquiring such data with an ultrasound system and providing the acquired data to the computer system, which may be a part of or separate from the ultrasound system.

The ultrasound data can be ultrasound radiofrequency ("RF") data, ultrasound in-phase quadrature ("IQ") data, or the like. In general, the ultrasound data contains one or more spatial dimensions, which may include a lateral dimension, an axial dimension, an elevational dimension, and combinations thereof. For instance, the ultrasound data can contain two spatial dimensions, such as the lateral and axial dimensions. The ultrasound data may also contain a temporal dimension, such as a dimension in slow time (i.e., the temporal direction along which multiple ultrasound signals are collected).

As stated above, the ultrasound data are acquired from a subject who has been administered a microbubble contrast agent. In some embodiments, different microbubbles (e.g., microbubbles with different sizes) with different resonant ultrasound frequencies can be used for imaging, so that by selecting a specific ultrasound frequency (e.g., either transmit or receive at a specific frequency), only a subgroup of selected microbubbles will be imaged, thereby forming ultrasound data containing isolated microbubble sources. As another example, an ultrasound pulse that has sufficient energy to rupture a certain number of microbubbles can be used, wherein the ruptured microbubbles then release the free gas bubbles from the microcapsule and generate ultrasound signals that have different amplitude than the intact microbubbles. This effectively creates isolated microbubble sources that can be used for high-resolution imaging.

The microbubble signal can be obtained from both the linear and nonlinear components of the ultrasound wave. The linear component is typically at the fundamental frequency of the applied ultrasound wave, while the nonlinear component can be at the harmonic frequencies of the applied ultrasound wave, at the fundamental frequency of the applied ultrasound wave, or both. For instance, the nonlinearity introduced by amplitude-modulation-based imaging methods can be at the fundamental frequency.

The ultrasound data are processed to remove tissue motions, as indicated at step 104. For in vivo imaging, transducer movement and tissue motion induced by the cardiovascular (e.g., heart beat and pulsatile motion from arteries) and respiratory systems can be present. The amplitude of these motions can be significantly larger than the size of the microvessel to be resolved, thereby introducing significant blurring of the microvessel images and causing inaccurate blood flow speed measurements. Therefore, the ultrasonically detected microbubble signal can be processed to remove these tissue motions.

Figure 2:
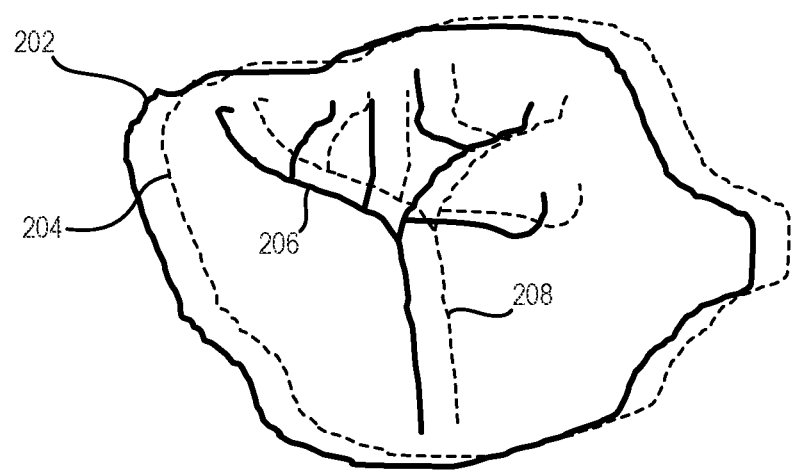
FIG. 2 depicts an example of microvessels that move between consecutive time frames as a result of tissue motion.

As one example, the ultrasound data can be processed to realign spatially misregistered microbubble signals that are from the same microvessel location. For example, as shown in FIG. 2, due to physiological motion such as breathing, the tissue 202 is moved to a different tissue location 204 and the targeted microvessel 206 is moved to a different microvessel location 208. If unaccounted for, this misregistration (i.e., the movement) will cause errors in the final microvessel images.

To correct for the misregistration caused by tissue motion, image registration and tissue motion compensation methods can be used. For example, an image intensity-based image registration method, such as an affine transformation, can be used to translate, rotate, scale, and shear a misregistered image back to the original location. Other image registration methods that can be used include an image-feature based image registration, a spectral-phase based image registration, a transform model based image registration, and so on. As another example, an ultrasound speckle tracking-based method, such as two-dimensional normalized cross-correlation, can be used to estimate the movement vector between the reference signals and the moved tissue and microvessel signals. The signals can then be realigned by reversing the movement based on the estimated movement vector. As yet another example, a two-dimensional phase-shift map can be estimated between the reference image and the moved image, which can then be applied to the Fourier domain to the moved image followed by an inverse Fourier transform to correct for the movement. As one non-limiting example, the microbubble signal registration process is performed between each frame of ultrasound microbubble signal and a reference frame of microbubble signal (e.g., the first frame of the imaging sequence). Due to the high frame rate acquisition of ultrasound data, the estimate tissue motion can be generally assumed to be smooth along the temporal direction without sharp peaks that would otherwise indicate fast tissue movement that are physiologically unrealistic. This characteristic of the tissue motion can be used to suppress false peaks of the tissue motion estimation and, thus, minimize misregistrations.

Referring again to FIG. 1, after tissue motions are removed from the ultrasound data, microbubble signals are isolated in the ultrasound data, as indicated at step 106. In general, isolating the microbubble signals includes isolating microbubble signals from the background signals, such as tissue signal and signals from stationary microbubbles that do not change position between acquisition frames (e.g., when a microbubble does not move between frames). In some embodiments, the microbubble signals can be isolated using a frame-to-frame signal subtraction, a high-pass filtering along the temporal direction of the signal, a singular value decomposition ("SVD")-based filtering, and so on.

As one example, temporal high-pass filtering can be used to isolate microbubble signals. In these implementations, a cutoff frequency that is lower than the temporal frequency of the moving microbubble signal, but higher than that of stationary background signal can be used to filter the ultrasound data to isolate microbubble signals.

As another example, an SVD-based filtering can be used, in which a singular value cutoff can be used to separate the background signal (e.g., the tissue signal and non-moving microbubble signal, which are typically projected to low-order singular values) from the isolated moving microbubble signals (which are typically projected to intermediate-to-high-order singular values). As one example, the block-wise adaptive SVD filter described in co-pending U.S. Patent Application Publication No. US 2019/0053780, which is herein incorporated by reference in its entirety, can be used to implement an SVD-based filtering to extract the microbubble signals. As another example, the accelerated SVD filter described in co-pending U.S. Patent Application Publication No. US 2018/0220997, which is herein incorporated by reference in its entirety, can be used to implement an SVD-based filtering to extract the microbubble signals.

Optionally, the isolated microbubble signals can then be denoised, as indicated at step 108. The microbubble microvessel imaging techniques described in the present disclosure are based on the power-based cross-correlation map between the microbubble signal and PSF. As such, removing the noise in each frame of the microbubble signal can help to reduce the noise in the cross-correlation calculation and thus improve the robustness of the microvessel imaging.

In general, noise has similar features to microbubble signals, and it can be challenging to differentiate the two when the noise becomes stronger and the microbubble signal gets weaker in deeper regions of the tissue. As a result, noise signals can be falsely marked as microbubble signals, which results in inaccurate microvessel delineation and velocity estimation.

As one example, denoising can be implemented using an intensity-based thresholding method. Such methods are more accurate when it can be assumed that the microbubble signals are stronger than the background noise signals. For example, by suppressing pixels with intensity values less than a selected value (e.g., −30 dB to the maximum intensity value in the current field-of-view), a significant amount of background noise can be suppressed. However, these methods may not be as accurate in regions where microbubble signals are similar to noise (e.g., deep regions of the tissue). Also, the threshold value has to be carefully chosen to avoid falsely rejecting the microbubble signal or preserving too much noise.

As another example, the microbubble signals can be denoised based at least in part on the spatiotemporal information contained in the microbubble signals. Because microbubbles move with blood flow, the microbubble movements are deterministic events that can be continuously tracked in multiple acquisition frames, while noise events are random and will not show any track-like features across multiple acquisition frames. These differences between microbubbles and noise can be exploited in the spatiotemporal domain for robust noise suppression. As an example, a non-local means ("NLM") denoising filter can be applied to the original, noisy microbubble data.

Another advantage of the spatiotemporal denoising filter described above is that because the denoising is performed in the spatiotemporal domain, there is little to no spatial blurring of the underlying microbubble signal. Other denoising methods (e.g., convolutional Gaussian smoothing, Gaussian spectral apodization, wavelet thresholding, or iterative total variation ("TV") minimization) can also be used in the spatiotemporal domain to achieve similar denoising effect. In some implementations, the axial-temporal microbubble signal data can be used for denoising, while in other implementations lateral-temporal data or full axial-lateral-temporal 3D data can also be used for denoising.

After the microbubble signal data are denoised, the microvessel images can be generated based on the proposed power-based cross-correlation technique detailed in the present disclosure. The microvessel images can be displayed to a user or stored for later use, such as for later analysis, as indicated at step 118. In some implementations, microvascular morphology measurements (e.g., vessel density and vessel tortuosity) can be estimated from the microvessel images. As another example, microvessel hemodynamics measurements (e.g., blood flow speed and blood flow volume) can be estimated from the microvessel images. For instance, the microvessel images can be superimposed, or presented side-by-side, with B-mode images of the targeted tissue. Alternatively, microvessel blood flow speed images with color-encoded flow direction can also be superimposed, or presented side-by-side, with B-mode images of the targeted tissue. In such implementations, a multi-flow-direction color hue can be used to indicate more than two directions of flow.

Conventional microbubble localization may be performed at step 110 and may include identifying locations in each time frame of the microbubble signal data at which microbubbles are located. For instance, the center location of each isolated microbubble signal is located, such that the movement of the microbubble can be tracked through time. The center location of the localized microbubbles can also be used to construct super-resolution microvessel images and to track the movement of the microbubbles to calculate hemodynamics measurements, such as blood flow speed. Conventional super-resolution imaging methods rely upon localization of the center position of microbubbles.

Figure 3:
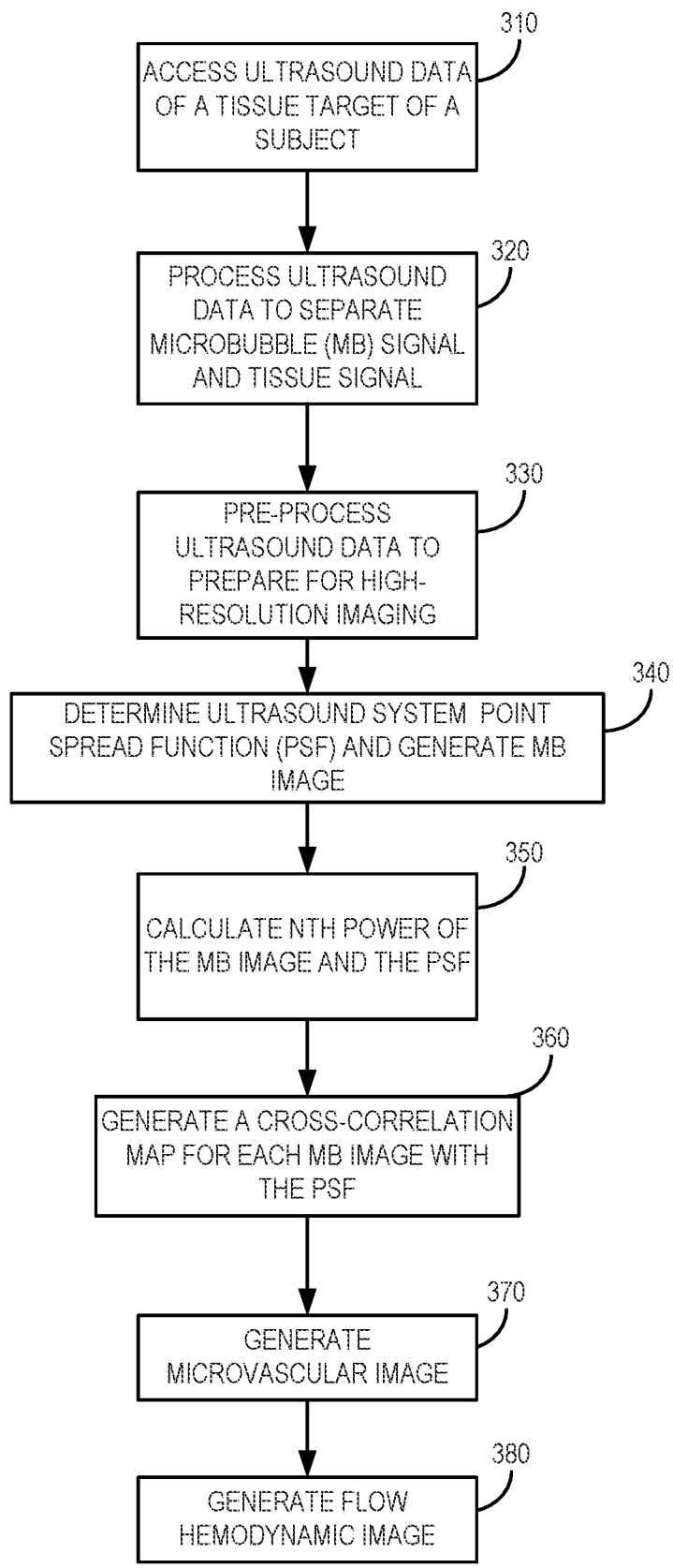
FIG. 3 is a flowchart setting forth the steps of an example method for producing high definition microvessel images based on a power-based cross-correlation method.

Systems and methods are provided in the current disclosure for directly utilizing the correlation map to generate images with substantially improved spatial and temporal resolution by using the Nth power of the MB signal and PSF to improve the resolution of the cross-correlation maps, which may not use the center position of microbubbles. Referring to FIG. 3, a flowchart setting forth the steps of one non-limiting example of such a cross-correlation-based method is now illustrated. Ultrasound data may be accessed, such as from an image archive, or may be acquired from a target tissue at step 310 with the administration of microbubbles (MBs) or other suitable ultrasound contrast agents. MB signal may be separated from the tissue signal via an MB signal detection by processing the ultrasound data at step 320, such as by using a tissue clutter filtering technique, and the like. Pre-processing may be used to improve the signal-to-noise ratio (SNR) and prepare the data for high-resolution imaging at step 330. A PSF may be determined at step 340, and an MB image may be generated. The Nth power of the MB image and PSF can be determined and used at step 350 to improve the resolution of a cross-correlation map, where N is the order of power. The Nth power of the MB image and the PSF can determine the sharpness of the final microvessel image. A cross-correlation map between each MB image and the PSF of the system can be generated at step 360. Accumulation of the power-based cross-correlation maps over a select number of frames can generate a high-resolution high-contrast image of the microvasculature at step 370. Individual MB trajectories on the spatial-temporal cross-correlation maps may be used to provide MB moving speed and direction estimations, which can be utilized to image the flow hemodynamics at step 380.

The method of FIG. 3 may be performed in a block-wise processing manner. Such an approach provides that the microvessel image processing can be done on a smaller subset of data separately, and a combination of all of the subsets can generate a microvessel image with improved performance.

Still referring to FIG. 3, ultrasound data can be accessed or acquired at step 310 from a region-of-interest (ROI) in a targeted tissue with administered ultrasound contrast agents. Any suitable contrast agent can be used, including but not limited to MBs, phase-changing droplets, nanodroplets, gas vesicles, and the like. The ultrasound data can be any suitable format, including but not limited to ultrasound RF data, ultrasound IQ data, ultrasound envelope data, ultrasound B-mode data, and the like. The ultrasound data can be acquired using any suitable detection sequence, including but not limited to focused-beam line-by-line imaging, widebeam multi-line acquisition imaging, compounding plane wave imaging, compounding diverging wave imaging, synthetic aperture imaging, and the like. Ultrasound data can be acquired based on linear ultrasound components, such as fundamental imaging, or nonlinear ultrasound component, such as pulse inversion ("PI"), amplitude modulation ("AM"), and pulse inversion amplitude modulation ("PIAM") imaging, or the combination thereof. In general, the acquired ultrasound data may contain one or more spatial dimensions, which may include a lateral dimension, an axial dimension, an elevational dimension, and combinations thereof. The ultrasound data may also contain a temporal dimension, such as a dimension in slow time (i.e., the temporal direction along which multiple ultrasound frames or volumes are collected).

MB signal detection and separation of MB and tissue signals at step 320 in FIG. 3 may be performed by extracting signals representing blood flow information and rejecting background signal representing tissue clutter and noise. Blood flow imaging may be enhanced with this signal separation. In general, MB flows in the vessels along with the blood cells and is distinct from the tissue signal in terms of spatial-temporal characteristics, and thus a suitable clutter filtering technique for blood flow imaging can be applied to extract MB signals. In non-limiting examples, MB signals can be obtained using frame-to-frame signal subtraction, high-pass tissue clutter filtering, SVD-based tissue clutter filtering, regression-based tissue clutter filtering, Eigenbased filtering, and the like. For some implementation, such as CEUS, where signals from MBs may be detected via exploiting the nonlinear response of the MBs and the tissue clutter may be suppressed, a clutter filtering process may not be necessary.

High signal-to-noise ratio (SNR) of the obtained MB signal may provide for the generation of optimized microvessel images. Low SNR may result in false detection of MBs and thus artifacts in the final microvessel images. The extracted MB data may be subject to pre-processing at step 330 in FIG. 3 that may include denoising, enhancement, equalization, and the like, of the MB signals. In one non-limiting example, an intensity threshold can be set so that signals below the set threshold may be considered noise and rejected from the MB data, providing an enhanced MB data with suppressed noise background. A fixed threshold or an adaptive threshold may be used. In another non-limiting example, SNR of the MB data may be improved by denoising based on the spatial-temporal characteristic of the data. Since MB typically moves consistently over multiple ultrasound frames, which is distinct from the behavior of random noise, any denoising filters working on spatial-temporal data may be applied. The denoising filter may include, but is not limited to, a non-local means (NLM) denoising filter, any form of spatial-temporal low-pass filter, smooth filter, median filter, Savitzky-Golay filter, nonlocal mean filter, amplitude thresholding, and the like. Ultrasound signal intensity may be spatially-dependent due to the effect of time-gain compensation (TGC), tissue attenuation, and beamforming process, such that an intensity equalization may also be used to equalize the spatial-dependent intensity of the MB signals for subsequence processing. Non-limiting examples of such techniques, such as using a noise profile to equalize the MB signals, may be found in U.S. Patent Application Publication No. US 2019/0053780, which is hereby incorporated by reference.

In another non-limiting example, a noise floor of the ultrasound image can be measured from the ultrasound system, and used as a spatial varying threshold to suppress noise in the MB images. The background noise is typically spatial varying, where the deep region has a higher noise level due to the higher TGC used. A spatial varying threshold corresponding to the spatial varying noise level may be used in some configurations and provide effective noise suppression. The noise floor of the ultrasound system as a spatial-dependent threshold may be used so that a pixel in the MB image below the threshold is considered noise and removed from the image. A scale can be applied to the noise floor image to control the spatially-varying threshold, as:

$$MB_{denoised}(x, y) = \begin{cases} MB_{original}(x, y) & \text{if } MB_{original}(x, y) > \alpha \cdot N(x, y) \\ 0 & \text{if } MB_{original}(x, y) \leq \alpha \cdot N(x, y) \end{cases}$$

Where $MB_{denoised}(x,y)$ is the denoised MB image, $MB_{original}(x,y)$ is the original MB image, and $N(x, y)$ is the spatial varying noise floor. $\alpha$ is the scaling factor determining the overall level of the threshold, $\alpha$ can be any positive value. If the background noise follows a normal distribution, and the noise floor is estimated as the standard deviation of the noise, then 68.2% of the noise pixel can be rejected by setting $\alpha=1$, and 95.4% of the noise pixel rejected with $\alpha=2$, and 99.8% when $\alpha=3$. In practice, a larger scaling factor may be better to suppress more noise and preserve MB signals with more confidence, but at the tradeoff of removing weak MB signals.

Referring to FIGS. 12A-12D, a non-limiting example of the spatial-dependent thresholding based on noise floor estimation is shown. The noise floor can be measured or estimated, such as with methods previously proposed in the U.S. Patent Application Publication No. US 2019/0053780, which is herein incorporated by reference in its entirety.

In a non-limiting example, the noise data can be collected by turning off the ultrasound transmission (e.g., setting acoustic output to zero) and only receiving with the same system configuration and imaging sequence (including same transducer, TGC gain settings, receive filters, beamforming settings, etc.) as used for the actual blood flow signal acquisition.

In a non-limiting example when turning off the acoustic output is not possible or desirable for some ultrasound systems, the noise data may be collected by minimizing the acoustic output and transmitting into the air. The strong echoes reflected from the air can be removed by a clutter filtering processing and the pure noise data can be extracted. Any suitable clutter filter can be used to remove the strong echoes from the air, such as high-pass tissue clutter filtering, SVD-based tissue clutter filtering, regression-based tissue clutter filtering, Eigen-based filtering, and the like. The noise floor can be estimated from the collected noise data as a measurement of the noise variance, noise standard deviation, noise mean, or other statistic characteristics in the temporal direction.

Referring to FIGS. 12E and 12F, a non-limiting example is shown for residual noise suppression after noise is suppressed with any of the above denoising methods, where there may still be residual noise present in the MB image. Given that residual noise is typically randomly distributed in the MB image, and has a small spatial size, while a true MB signal typically has a more consistent and larger size, thresholding process based on the size of the isolated objects in each MB image can be applied to remove objects with a size smaller than a given size threshold. A non-limiting example of the MB image before (FIG. 12E) and after (FIG. 12F) object size thresholding is shown, reflecting a better suppression of the residual noise. In order to optimally suppress background noise for microvessel imaging, one or more denoising methods as mentioned above can be applied separately or in a combined manner. A noise suppression method can also be applied to any conventional localization and tracking based super-resolution method to better provide for denoising.

Correlation or convolution of each frame of the MB data with a determined point-spread-function (PSF) may then be calculated to generate a cross-correlation coefficient map, as indicated at step 360 in FIG. 3. The PSF determined at step 340 in FIG. 3 may depend on the imaging setting, ultrasound system, center frequency, ultrasound pulse lengths, and the like, and can be generated in any suitable way. In some configurations, different time frames of the cross-correlation map may be used with a velocity estimation method, as described herein.

Determining the PSF can include retrieving a previously computed or estimated PSF from a memory or other data storage, or can include computing or estimating the PSF as needed.

In one non-limiting example, the PSF can be obtained from a simulation. For instance, the PSF can be simulated based on a multivariate Gaussian distribution or other possible theoretical models. Such a distribution is useful because it can account for ultrasound lateral resolution that is typically coarser than the axial resolution; however, other distributions can also be used to simulate the PSF.

As another non-limiting example, the PSF can be obtained from experimental measurements of a very small point object, such as an object that is much smaller than the ultrasound wavelength. For instance, the measured signal from a microbubble can be used as an approximation of the PSF of the ultrasound system. The PSF may be experimentally measured from a point target using the same ultrasound system and imaging setting.

In another non-limiting example, the PSF can be obtained from the isolated individual MB derived from the same MB dataset for microvessel imaging. Multiple individual MB signals may also be selected and combined to generate a smoother and more accurate PSF. PSF can be in any suitable data format corresponding to the MB data used, such as RF data, ultrasound IQ data, ultrasound envelope data, ultrasound B-mode data, and the like. Normalized or non-normalized correlation calculation can be applied to generate the cross-correlation map. The correlation or convolution can be performed on the spatial interpolated version of MB data to obtain a finer sample size. For each MB frame, a true MB signal may present a higher correlation coefficient, while the noise background or irrelevant signal may have a lower correlation coefficient in the cross-correlation map.

Thus cross-correlation maps can provide information on the presence/absence and the positions of MBs.

To improve the resolution of the cross-correlation map, the Nth power of the MB data and Nth power of the PSF may be determined at step 350 in FIG. 3 before calculating the cross-correlation map. Here, N can be any positive value; in non-limiting examples, N can be 1, 2, 3, 4, . . . , and the like. When N=1, the 1st power of the data is the same as the original data. An advantage of performing a correlation of Nth power of MB data and corresponding Nth power of PSF is that a sharper MB target can be achieved for each MB in the cross-correlation map. In some configurations, the power of the MB data and the power of the PSF may be equal or different. In non-limiting examples according to the present disclosure, these two powers are set to identical values in the examples given below.

Figure 4A:
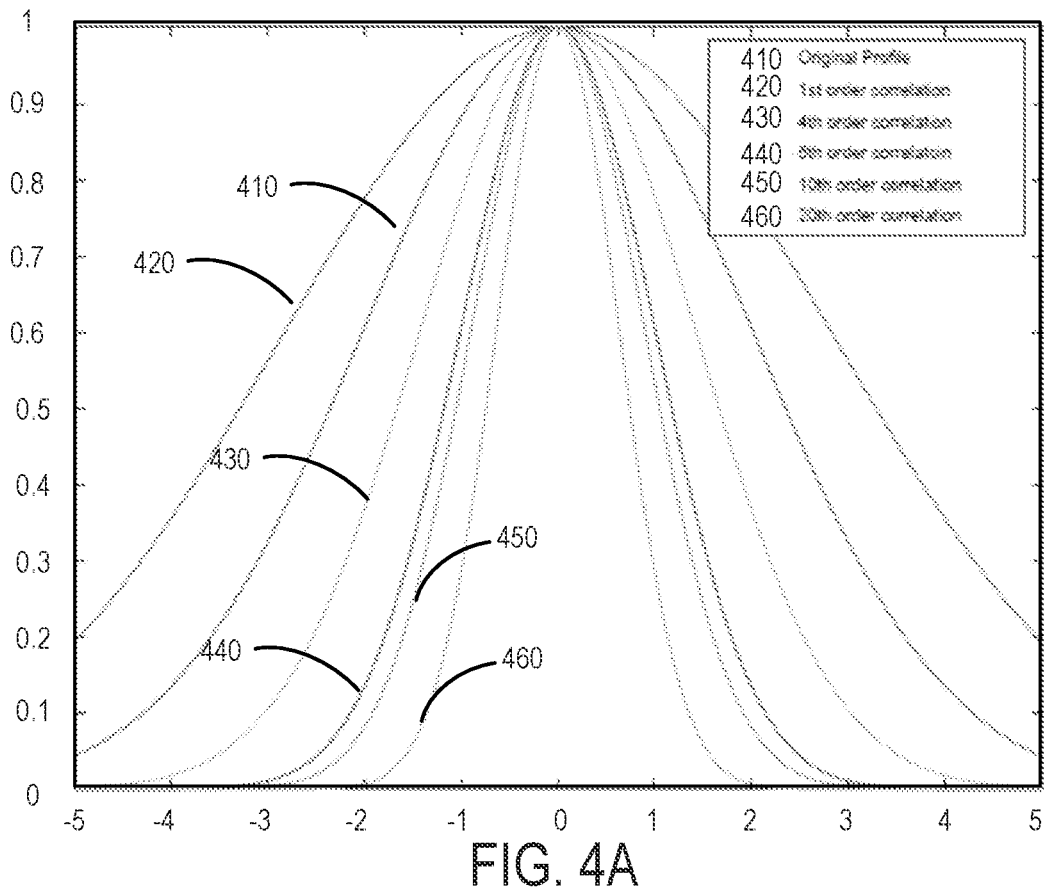
FIG. 4A is a non-limiting example of cross-correlation calculated Nth power 1-D Gaussian profiles computed between example data and a point spread function.

Referring to FIG. 4A, the resolution improvement of the Nth power method can be explained by using a non-limiting example 1-D model, in which the original MB signal 410 is assumed to be a 1-D Gaussian profile, thus the PSF is also a 1-D Gaussian profile. The cross-correlation or convolution of a Gaussian profile (MB signal) and a Gaussian profile (PSF) is also a Gaussian profile, but with wider width. Directly applying a correlation calculation to the original MB data will generate a cross-correlation map with a worse resolution than the original MB signal, such as first order correlation 420. By contrast, the cross-correlation of the Nth power of the Gaussian profiles can provide a sharper profile with a smaller full width at half maximum (FWHM). As indicated by the non-limiting example graph, the cross-correlation profile gradually becomes sharper with the increase of power order N, as shown by $4^{th}$ order correlation 430, $6^{th}$ order correlation 440, $10^{th}$ order correlation 450, and $20^{th}$ order correlation 460.

Figure 4B:
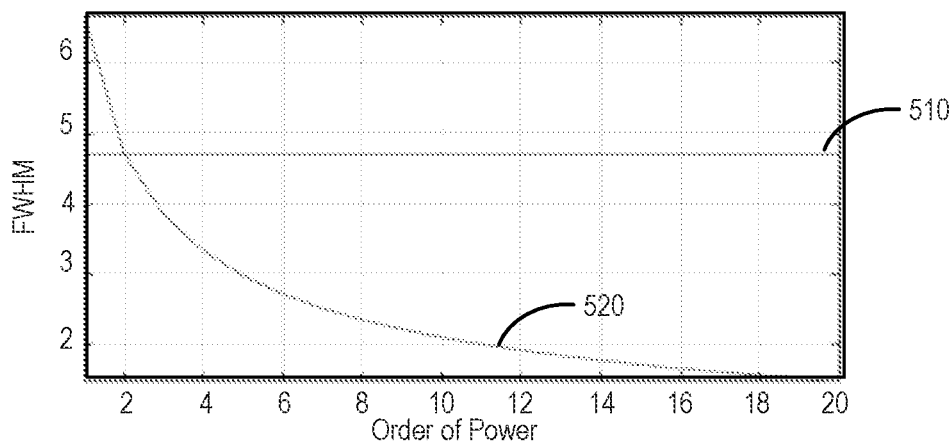
FIG. 4B is a non-limiting example of the relationship of FWHM to the order of power of the cross-correlation from FIG. 4A.

Referring to FIG. 4B, a non-limiting example FWHM graph is shown with the quantitative relationship between the FWHM of the cross-correlation profile and the power order N. Original line 510 indicates the FWHM of the original MB profile, while cross-correlation line 520 indicates the FWHM of the resulting cross-correlation profile with different Nth power. The cross-correlation profile starts becoming sharper than the original MB profile when N>2. For the Gaussian model, the FWHM can be improved by a factor of $1/\sqrt{N}$. The methods of the present disclosure may be applied to 2D, 3D or even higher dimension data.

Figure 5:
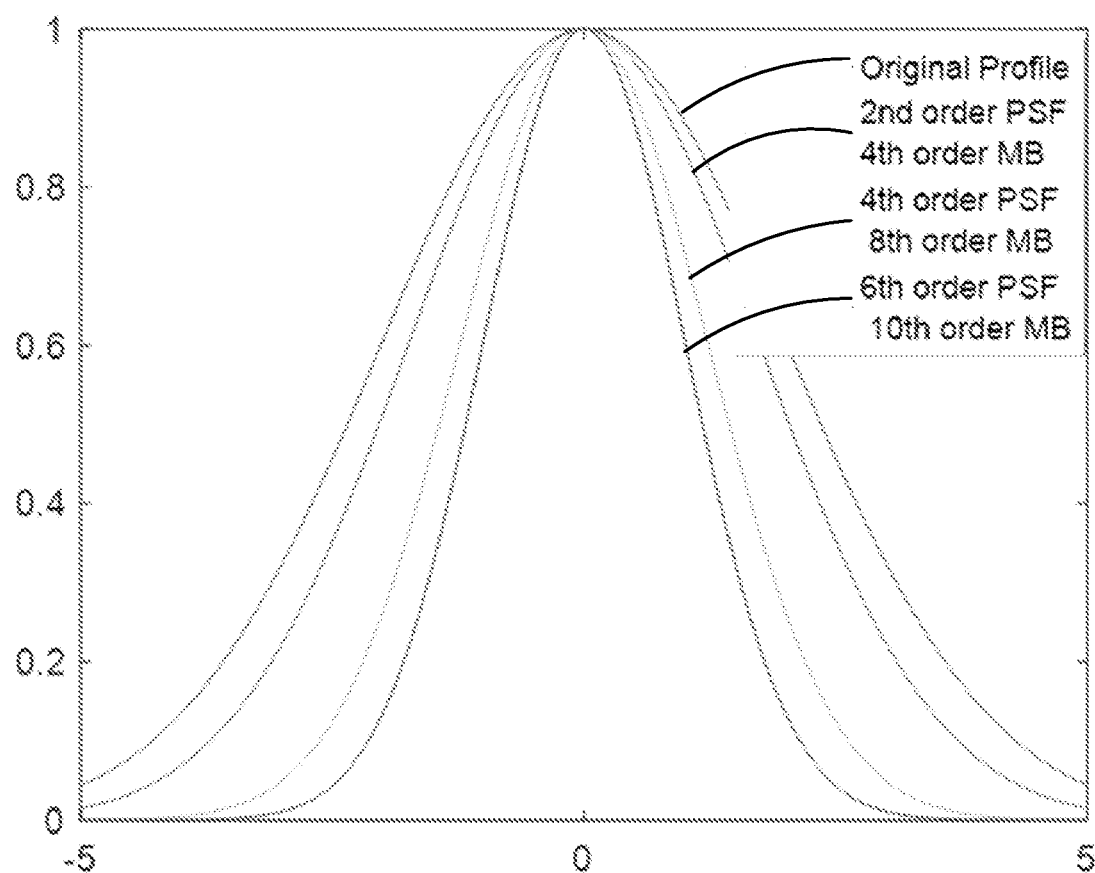
FIG. 5 is a non-limiting example of cross-correlation calculated with different Nth power 1-D Gaussian profiles computed between example data and a different Nth power point spread function.

Referring to FIG. 5, in some configurations, the power of the MB data and the power of the PSF can be different. FIG. 5 depicts non-limiting examples of the resolution improvement of the power based method with different power order for MB data and PSF. As indicated by the non-limiting example graph, the cross-correlation profile gradually becomes sharper with the increase of power order, without the need of order of MB data and PSF to be identical.

Referring to FIGS. 6A-6D, non-limiting example resulting images of different degrees of the Nth power method are shown. An original 2D MB signal is shown in FIG. 6A. The corresponding cross-correlation map obtained with 1st power is shown in FIG. 6B, 4th power in FIG. 6C, and 8th power in FIG. 6D of the original MB signal. The higher the power order the smaller the target profile for each MB, and thus sharper cross-correlation maps can be obtained. In conventional super-resolution imaging, only a single point will be labeled on at the center of each MB, which results in a very sparse image with a handful of non-zero pixels for the example shown in FIG. 6A. To obtain a visually smooth conventional super-resolution image, accumulation of millions of MBs may be required, which may require very long acquisition time. Improvement in resolution for such conventional methods comes at the cost of very long acquisition times.

By contrast, the power correlation method according to the present disclosure may change the resolution by the selection of power. Each sharpened MB in the powered correlation map may still contain many high-resolution pixels. Fewer MBs may be needed in the accumulation step to form a visually smooth high-resolution microvessel image. Data acquisition times may be reduced and high spatial resolution may be achieved without the need for long acquisition time.

Referring to FIGS. 7A-7D, non-limiting example threshold sharpening images of the cross-correlation are shown. In some configurations, to further sharpen the image thresholding may be applied to the resultant cross-correlation map to reject correlation coefficient values below a selected threshold. Using a threshold approach, for each individual MB a small target can be produced in the cross-correlation map. Non-limiting examples of thresholding on the cross-correlation map are shown in FIGS. 7A-7D, with smaller MB targets being produced by a larger threshold. The threshold can thus control the final resolution of the microvessel image.

In some configurations, a denoising process can be applied to remove suspicious targets in the cross-correlation map. True MB signal typically has a well-developed Gaussian shape, which may be exploited since noise or irrelevant signal may appear as an irregular morphology in the cross-correlation map with smaller target size. These unwanted signals can in this way be identified and removed from the correlation map based on the target morphology or target size. In a non-limiting example, thresholding can be applied to remove objects with a size smaller than the given threshold, preserving objects with larger sizes in the cross-correlation map to improve the confidence and reliability of MB detection.

Figure 8:
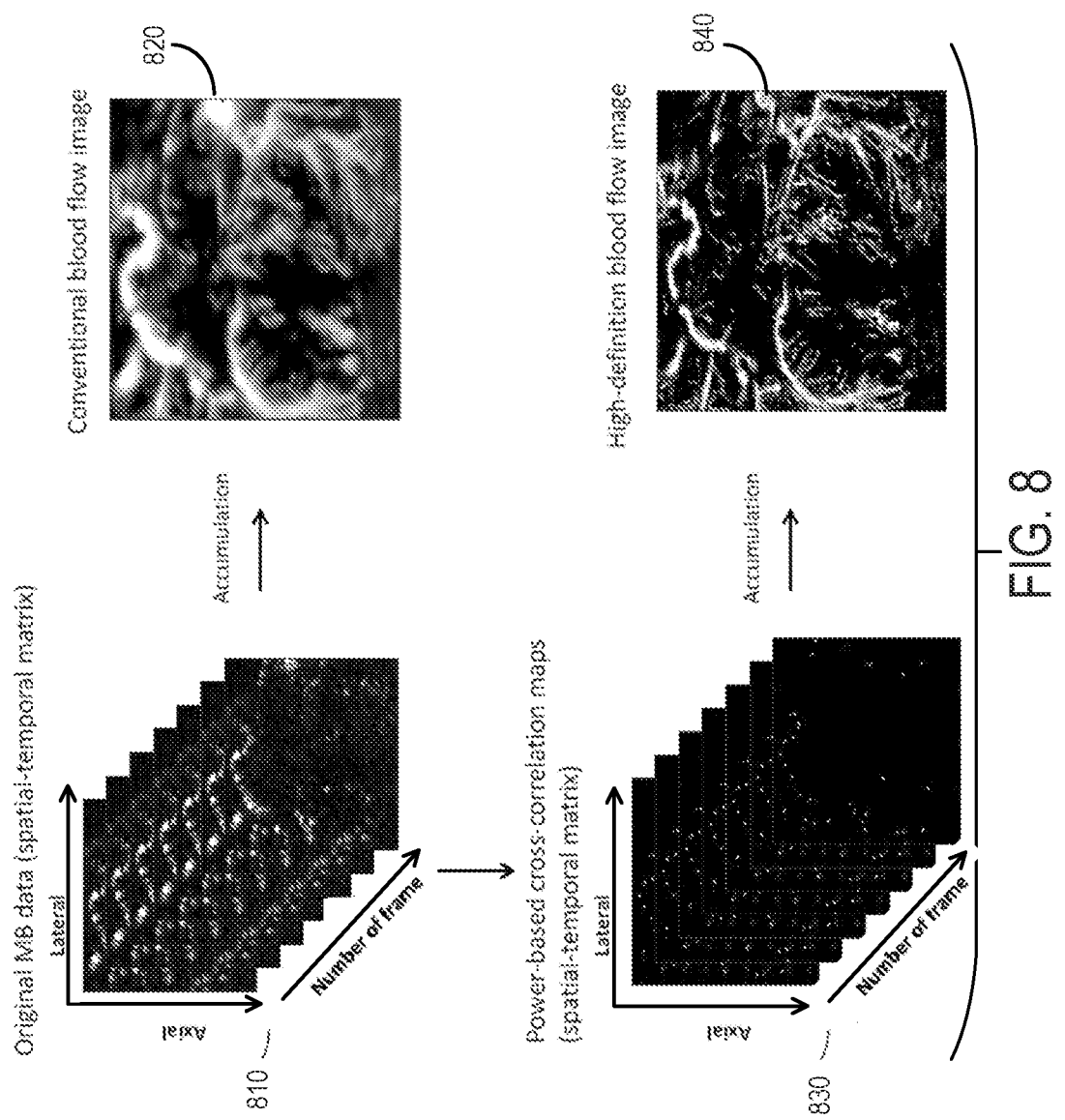
FIG. 8 depicts a non-limiting example of original MB data and cross-correlation maps across a number of frames and a resulting high-definition blood flow image from accumulation.

Referring to FIG. 8, a non-limiting example of generating high-resolution and high-contrast microvessel images according to step 370 in FIG. 3 by accumulating the cross-correlation maps over a select number of frames, is shown. The conventional power Doppler blood flow image 820 can be generated by the accumulation of the original MB signal directly over a select amount of frames 810, the resolution of which may be limited by the ultrasound wavelength and imaging settings. In a non-limiting example, the accumulation may be conducted based on the power-based cross-correlation map 830, which can generate a microvessel image 840 with resolution beyond the limitation of the imaging system. The resolution of the final microvasculature image may be controlled by the power order and the thresholding of the cross-correlation maps described above. In some configurations, a user interface may be provided to the users such that the users can select or adjust the final resolution to meet the requirement of a clinical application.

For in vivo applications, tissue motion or ultrasound probe motion during scanning may introduce blurring in the final microvessel image, deteriorating the performance of the method. In some configurations, motion registration may be introduced to remove tissue motion to avoid blurring. Image registration may be performed based on motion estimations from the original acquired ultrasound data, and/or the clutter filtered MB data. Any suitable image registration algorithm may be applied, including but not limited to global or local cross-correlation methods, global or local phase-correlation based methods, global or local optical flow methods, and the like.

Figure 9:
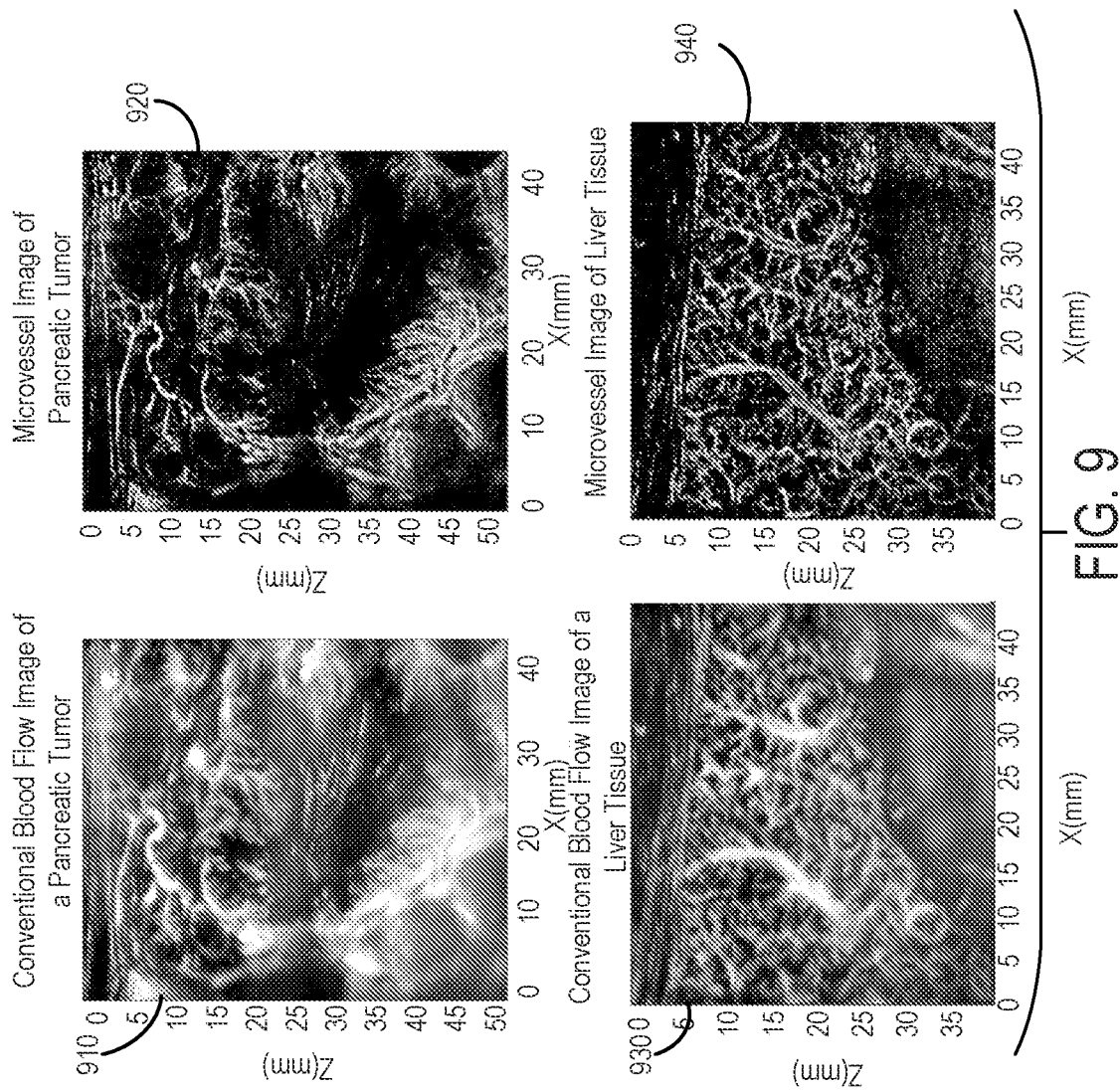
FIG. 9 depicts non-limiting examples of original and microvessel images processed in pancreatic tumor and liver tissues.

Referring to FIG. 9, non-limiting example images are shown for two in vivo microvessel images obtained by the methods of the present disclosure using a data length of approximately 2 seconds, compared with the conventional contrast-enhanced blood flow images. Improvement of the pancreatic microvessel image 920 over the conventional pancreatic blood flow image 910 is shown, along with the improvement of the liver microvessel image 940 over conventional liver blood flow image 930.

In some configurations, additional quality control may be applied prior to accumulation to suppress false MB signals and noise. A true MB target may move steadily over multiple adjacent frames, producing a continuous MB trajectory in the 3D spatial-temporal matrix (such as the matrix shown in image 830) of the correlation map. By contrast, random noise or irrelevant signal may not have continuous movement, and thus appears in the spatial-temporal matrix as an isolated target instead of a long trajectory. The longer the trajectory, the higher the confidence of the signal to be a valid MB. Accordingly, thresholding may be conducted in the 3-D spatial-temporal matrix to reject targets with size or length below the selected threshold to improve the confidence and reliability of the MB detection for microvessel imaging.

Figure 10:
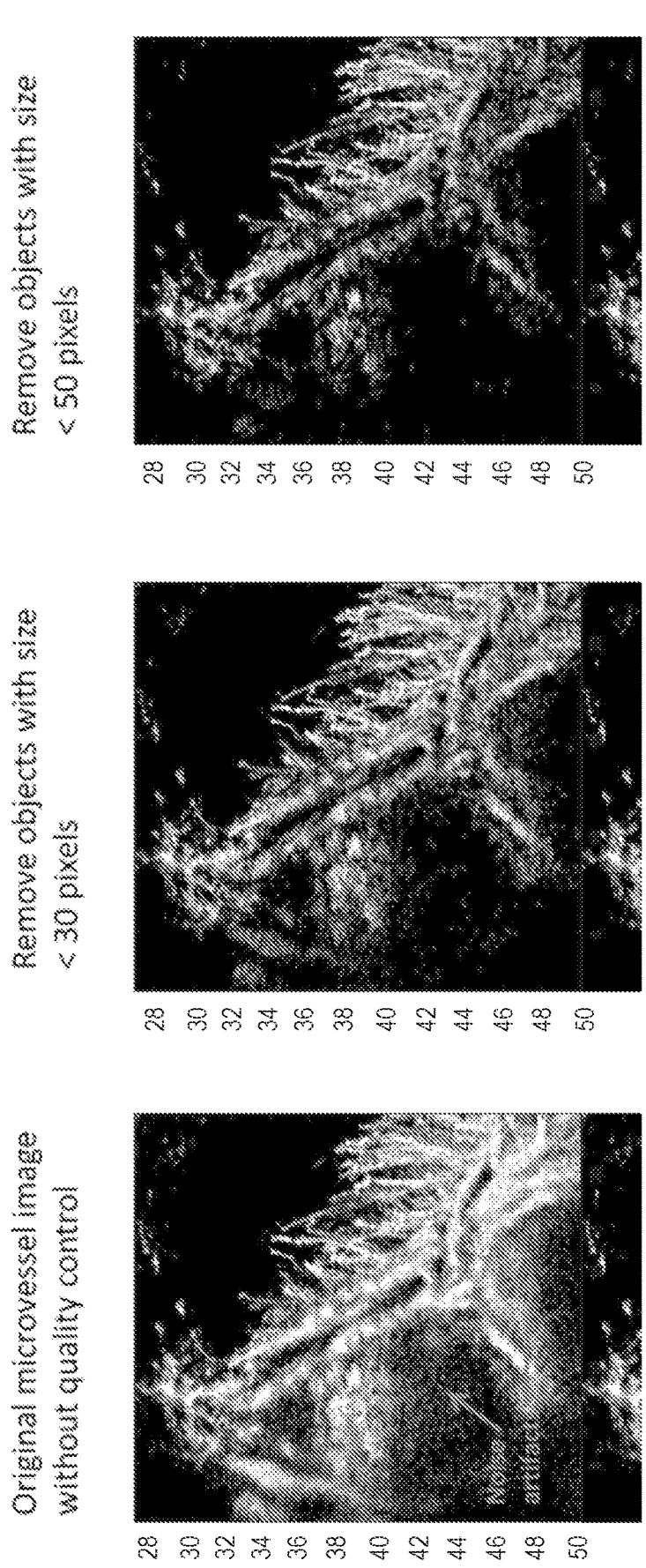
FIG. 10 depicts non-limiting examples of original and threshold processed images.

Referring to FIG. 10, non-limiting examples of quality control adjusted images based on target size thresholding are shown. The improved noise suppression for a high-definition image may be seen as the size of objects smaller than the selected number of pixels are removed. The quality control can also be performed in the resultant accumulated 2D microvessel images. In a non-limiting example, a 2D accumulated image can be generated from a certain number of correlation maps, such as 10 frames of correlation map, and thresholding may be applied to reject small targets and preserve MB trajectories in this 2D microvessel image. In a further non-limiting example, the same process may be repeated, such as being applied to the next 10 frames of correlation maps with or without overlapping. The final microvessel image may be obtained by combining or accumulating all these separate thresholded microvessel images.

Figure 11B:
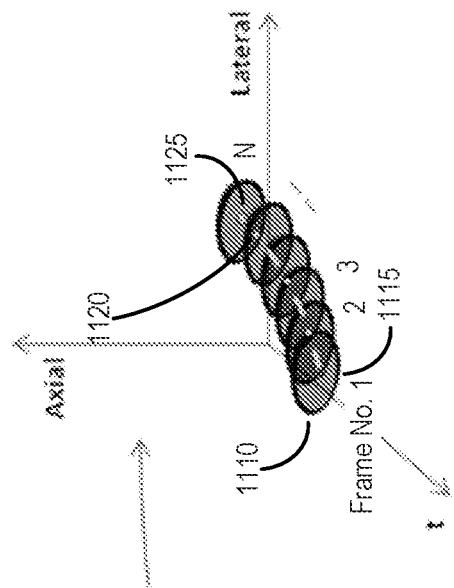
FIG. 11B depicts a close-up portion of FIG. 11A.
Figure 11A:
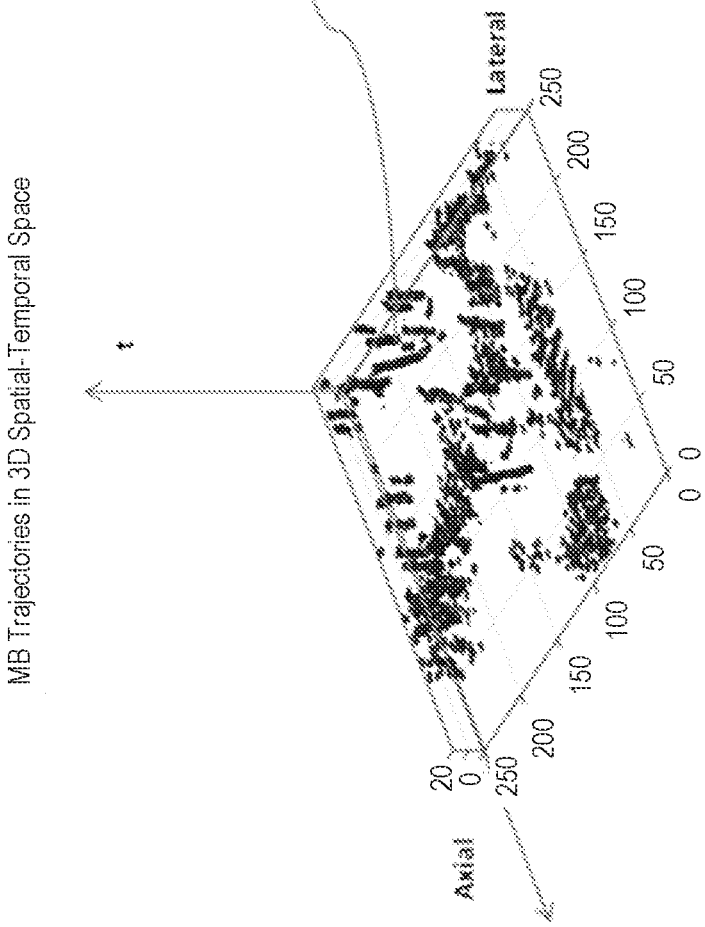
FIG. 11A depicts a non-limiting example of a MB trajectory in 3D spatial-temporal space with two spatial dimensions and one temporal dimension.

Referring to FIGS. 11A-11E, a non-limiting example of MB trajectories in 3D spatial-temporal space are shown in FIG. 11A with two spatial dimensions and one temporal dimension. Each isolated MB trajectory in the 3D spatial-temporal space represents the spatial moving trace of an MB over time. In some configurations, an MB moving trajectory analysis may be used to measure flow speed and moving direction of each MB based upon a 3D spatial-temporal matrix, as indicated at step 380 in FIG. 3. A high-resolution image of flow hemodynamics (e.g., a flow hemodynamic image), such as flow speed, flow direction, flow vectors, and the like, can be generated.

In some configurations, before velocity estimation, a quality control process can be applied to the 3-D spatial-temporal space to remove shorter or smaller trajectories, and only preserve those longer or larger trajectories, to improve the robustness of the velocity estimation. FIG. 11B shows the schematic diagram of an example of the one MB trajectory in the 3D spatial-temporal space. In FIG. 11B, the MB moves from first frame 1115 to Nth frame 1125, and each ellipse 1110 represents the MB in different frames of a cross-correlation map. These MB ellipses 1110 constitute a continuous trajectory in spatial-temporal space. The orientation and length of the trajectory may be determined by the MB moving speed and direction. By measuring the orientation and length of the trajectory, one can accurately estimate the MB flow velocity. Any suitable method can be used to measure the orientation and length of the trajectory.

Figures 11C, 11D, 11E:
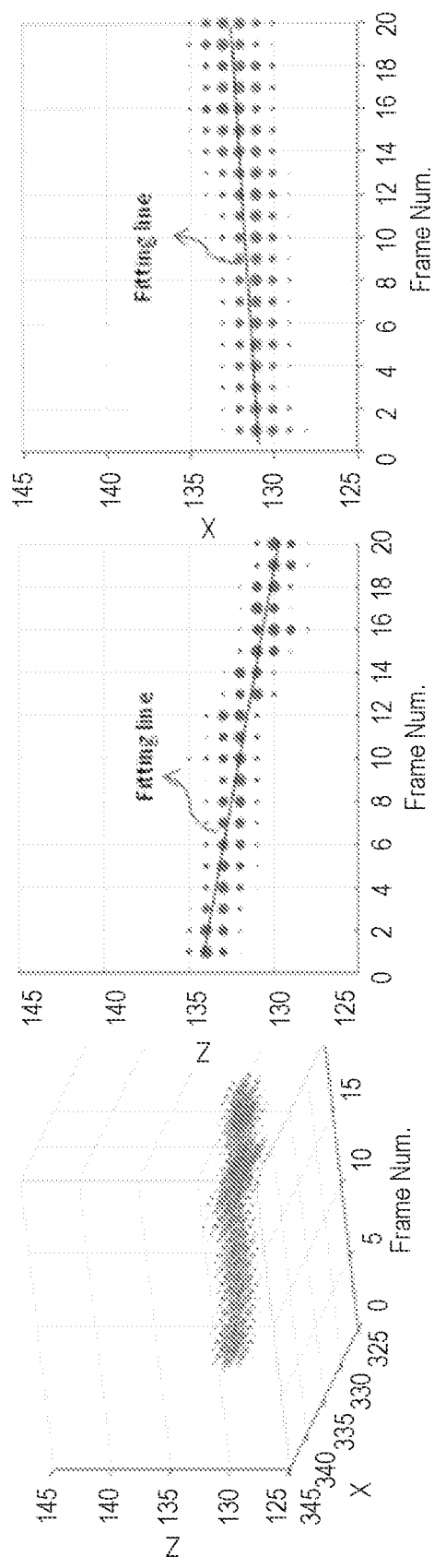
FIG. 11C depicts a non-limiting example of an isolated MB trajectory in 3D spatial-temporal space.
FIG. 11D depicts a non-limiting example of an isolated MB trajectory projected to an axial-temporal plane.
FIG. 11E depicts a non-limiting example of an isolated MB trajectory projected to a lateral-temporal plane.

In a non-limiting example, for each MB trajectory, a fitting can be applied to all the discrete samples/pixels inside the trajectory in the 3D spatial-temporal space to measure MB moving velocity. Any fit can be applied, including but not limited to linear fitting, linear regression, spline fitting, cubic fitting hyperbolic fitting, and the like. FIG. 11C shows the samples/pixels of an example MB trajectory in 3D spatial-temporal space, a linear fitting of all the trajectory samples can provide a quantitative measurement of the velocity vector (including magnitude and direction). In non-limiting examples, the slope of the fitting line with regard to the temporal direction can give an estimation of the MB velocity magnitude, and the angle of the fitting line in the spatial domain gives the information of MB moving direction.

In some configurations, the MB trajectory samples can be projected to the 2D axial-temporal plane, indicated by FIG. 11D, and 2D lateral temporal plane, indicated by FIG. 11E. The projections may be performed separately, and the fitting on the sample in these 2D planes provides the measurement of the velocity along axial and lateral directions, separately. The fitting lines in FIG. 11D and FIG. 11E indicates the fitted lines based on the MB trajectory samples. The slope of the fitting lines gives the estimation of the MB velocity in both directions. In a non-limiting example to further improve the robustness of the velocity estimation, a weighted fitting can be applied to the discrete samples/pixels of the MB trajectory. Any suitable weighted fitting can be utilized, including but not limited to weighted linear fitting, weighted linear regression, weighted spline fitting, weighted cubic fitting hyperbolic fitting, and the like. Any suitable weightings can be applied to the trajectory samples. In a non-limiting example, the trajectory samples can be weighted by the cross-correlation coefficients of the trajectory samples themselves, or weighted by the kth power of the cross-correlation coefficients, where k can be any arbitrary value.

For each MB trajectory, the fitting correlation coefficient (R), coefficient of determination ($R^2$), the mean, standard deviation or variance of the fitting error, or other statistic characteristics, can be used as an indicator of the fitting robustness. An additional quality control for velocity estimation can be applied by removing those MB trajectories with low robustness of fitting, indicated by low correlation coefficient (R), or coefficient of determination ($R^2$), or high fitting errors, and the like. Determining the desired fitting robustness may include establishing a threshold and removing the MB trajectories with low robustness of fitting, low correlation coefficient (R), low coefficient of determination ($R^2$), or high fitting errors that do not meet the established threshold. In some configurations, the measured velocity information (such as velocity magnitude or direction) for each trajectory (corresponding to one MB) may be stored in the spatial-temporal space, which may then be used to generate the final microvessel velocity image by combining the velocity values of all the MB trajectories passing through the same microvessel.

In some configurations, the measured velocity information for each trajectory may also be assigned to a shrinked trajectory in the spatial-temporal space, which may further improve the spatial resolution of the final microvessel velocity image. In some configurations, the final microvessel velocity image may be generated by simple averaging or weighted averaging of all the velocity trajectories in the spatial-temporal space along the temporal direction. For weighted averaging, the velocity trajectories can be weighted by any possible weightings, including but not limited to the cross-correlation coefficients of the trajectory samples themselves, the fitting correlation coefficient (R), coefficient of determination ($R^2$), the mean, standard deviation or variance of the fitting error, and the like. In non-limiting examples, microvascular morphology measurements (e.g., vessel density and vessel tortuosity) and microvessel hemodynamics measurements (e.g., blood flow speed and blood flow volume) can be estimated from the microvessel images. The microvessel images can be superimposed, transparently superimposed or presented side-by-side, with the B-mode images of the targeted tissue. In another non-limiting example, microvessel velocity images with or without color-encoded flow direction can also be superimposed, transparently superimposed or presented side-by-side, with the microvessel morphologic images or with B-mode images of the targeted tissue. A multi-flow-direction color hue can be used to indicate more than two directions of flow.

In another non-limiting example, each MB trajectory in 3D spatial-temporal space can be projected to the 2D spatial domain, and the projection area of the MB trajectory can be used to estimate the MB moving speed and direction. An MB with higher moving speed may have a larger projection area, and vice versa. Calculation of the projection area of each isolated MB trajectory may give an estimation of the MB velocity. In some configurations, the velocity can be estimated based on the relationship between projection area (A1) of the trajectory and the individual MB area (A0, e.g., the area of one ellipse 1110 in FIG. 11B). The ratio of A1/A0 may provide an estimation of MB moving speed.

In a non-limiting example, a fitting line 1120 can be applied to the characteristic point of each MB ellipse 1110, and the length and angle of the fitting line 1120 can be obtained for velocity estimation. Any fit can be applied, including but not limited to linear fitting, spline fitting, cubic fitting hyperbolic fitting, and the like. Any suitable characteristic point of each MB ellipse can be utilized in the current disclosure, including but not limited to the averaged center of the MB ellipse, the weighted averaged of the MB ellipse, the maximum position of the cross-correlation within the MB ellipse, the focuses of the MB ellipse, the edges of the MB ellipse or the like.

In some configurations, the slope of the fitting line with regard to the temporal direction can give an estimation of the MB velocity magnitude, while the angle of the fitting line in the spatial domain gives the information of MB moving direction. In some configurations, the MB characteristic points can be first projected to the 2D axial-temporal plane and 2D lateral temporal plane separately, and the fitting in the 2D planes provides the measurement of the velocity along axial and lateral direction, separately.

To further improve the robustness of the velocity estimation, a weighted fitting of the characteristic points can be applied. Any suitable weighted fitting can be utilized, including but not limited to weighted linear fitting, weighted linear regression, weighted spline fitting, weighted cubic fitting hyperbolic fitting, and the like. Any suitable weightings can be applied to the characteristic points. For each MB trajectory, the fitting correlation coefficient (R), coefficient of determination ($R^2$), the mean, standard deviation or variance of the fitting error, or other statistic characteristics, can be used as an indicator of the fitting robustness. An additional quality control for velocity estimation can be applied by removing those MB trajectories with low robustness of fitting, indicated by low correlation coefficient (R), or coefficient of determination ($R^2$), or high fitting errors. In a non-limiting example, the distance and angle between the characteristic points of the 1st and the last MB ellipses 1110 in the trajectory can be used for a rough estimation of the length and orientation of the trajectory. In this way, only the characteristic points of the first and last MB ellipses 1110 need to be calculated, which may reduce the calculation burden.

Figure 11F:
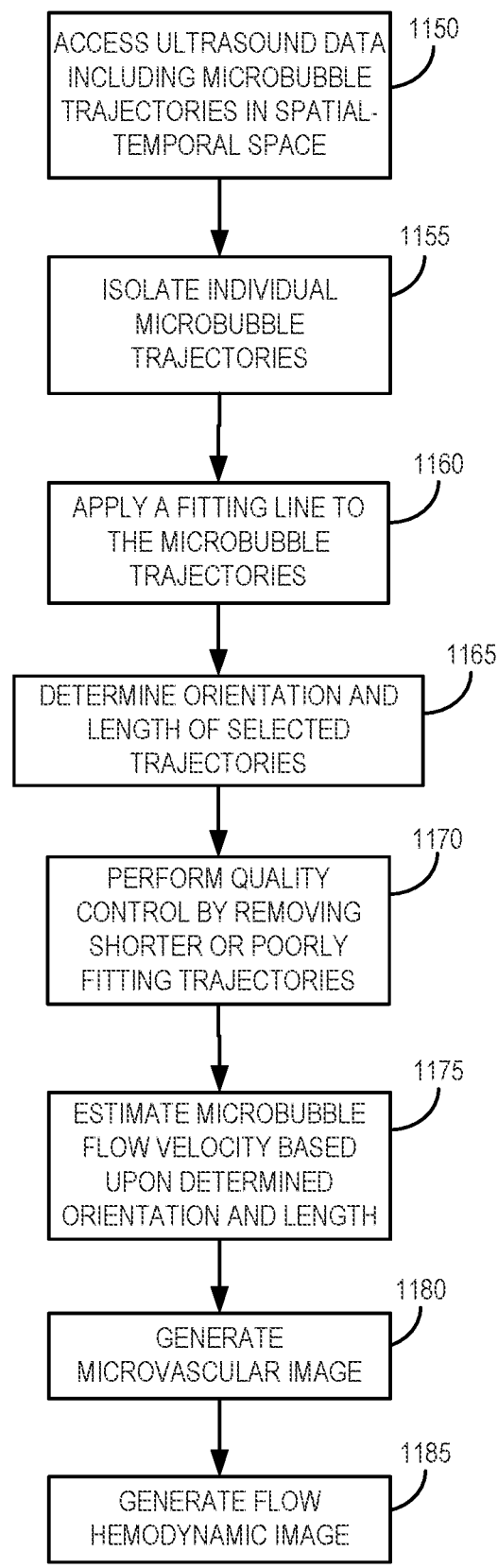
FIG. 11F is a flowchart setting forth the steps of an example method for producing high definition hemodynamic and microvessel images based on a MB velocity estimation method.

Non-limiting example steps are shown in the flow chart depicted in FIG. 11F for a velocity estimation method. Microbubble trajectories in spatial-temporal space are accessed, such as from an image storage archive, or acquired from image data at step 1150. Individual microbubble trajectories may be isolated at step 1155. A fitting line may be applied at step 1160 to the microbubble trajectories. In some configurations, the fitting line may be applied to more than one projection plane, such as a lateral or axial projection plane as described above. The orientation and length of selected trajectories may be determined at step 1165. Optional quality control may be performed at step 1170 by removing shorter trajectories, or those that are a poor fit to the fitting line, and the like, to improve the robustness of the velocity estimation. Microbubble flow velocity may be estimated based upon the determined orientation and length of the selected trajectories. Microvascular images and flow hemodynamic images may then be generated at step 1180 and 1185.

In some configurations, full field-of-view (FOV) data may be used. In some configurations, however, it may be advantageous to spatially divide the FOV data into multiple subsets of data with or without spatial overlapping, and apply the high definition microvessel imaging methods provided in the present disclosure to each subset separately. The final high-resolution microvessel image may be obtained by combining all the separated microvessel images from all the data subsets. Any suitable data separation method can be used and any suitable weighting function can be applied. In a non-limiting example, original data can be spatially divided into smaller blocks, with or without spatial overlapping. In a non-limiting example, original data can be divided into smaller blocks with spatial overlapping and each data subset is spatially weighted with a weighting function, such as the data separation methods disclosed in U.S. Provisional Patent Application No. 62/975,515, which is hereby incorporated by reference.

Separating the data into multiple subsets may be performed on the original data before tissue clutter filtering, or on the MB data after tissue clutter filtering, and/or a combination of these. When using the original data, an MB signal detection procedure such as tissue clutter filtering may be applied to each data subset separately. By dividing the original data into multiple subsets, an adaptive pre-processing unit, which may be specific for each of the subsets, may be applied. In a non-limiting example, an adaptive intensity threshold may be used so that signals below the given threshold are considered noise and rejected from each subset of MB data. The threshold for each subset of data can be adaptively determined based on the local statistics of the MB data. In some configurations, the threshold can be adaptively estimated based on the histogram of each data subset. In some configurations, the threshold can be adaptively determined based on the overall energy of each subset of MB data.

In some configurations, the PSF may be spatially varying, such that the PSF is different from one spatial position to another spatial position due to the ultrasound focusing, beamforming aperture, and the like. Different PSFs can be used for a different subset of data to calculate the spatial-specific cross-correlation map. Using a specific PSF for each subset of data may be beneficial for resolution improvement and optimization for each localized dataset. The spatial different PSFs may be estimated by model fitting, experimental measurement, derived directly from the same MB dataset, or a combination of these methods.

The present disclosure describes methods of MB imaging, but one skilled in the art would appreciate that the methods may also be applied to ultrasound imaging using any other type of ultrasound contrast agent, such as phase-changing droplets, nanodroplets, and the like, or may be applied to non-contrast ultrasound imaging without the use of contrast agent. The methods in the present disclosure disclose applications to two-dimensional imaging, but also apply to three-dimensional (3-D) or even higher dimensional imaging. In a non-limiting example, the method can be readily extended to 3-D where a 3-D PSF can be generated for cross-correlation calculation in 3-D. The proposed methods in the present disclosure may be combined with the MB signal separation disclosed in U.S. Provisional Patent Application No. 62/861,580, which is hereby incorporated by reference, where the original MB data can be separated into multiple subsets, each with sparser MB concentration allowing better imaging performance. The power-based cross-correlation method proposed in the current disclosure can also be combined with super resolution methods, such as the localization and tracking based super-resolution method (U.S. patent application Ser. No. 16/617,628) to improve the performance (accuracy and precision) of the MB localization on the cross-correlation maps.

Figure 13:
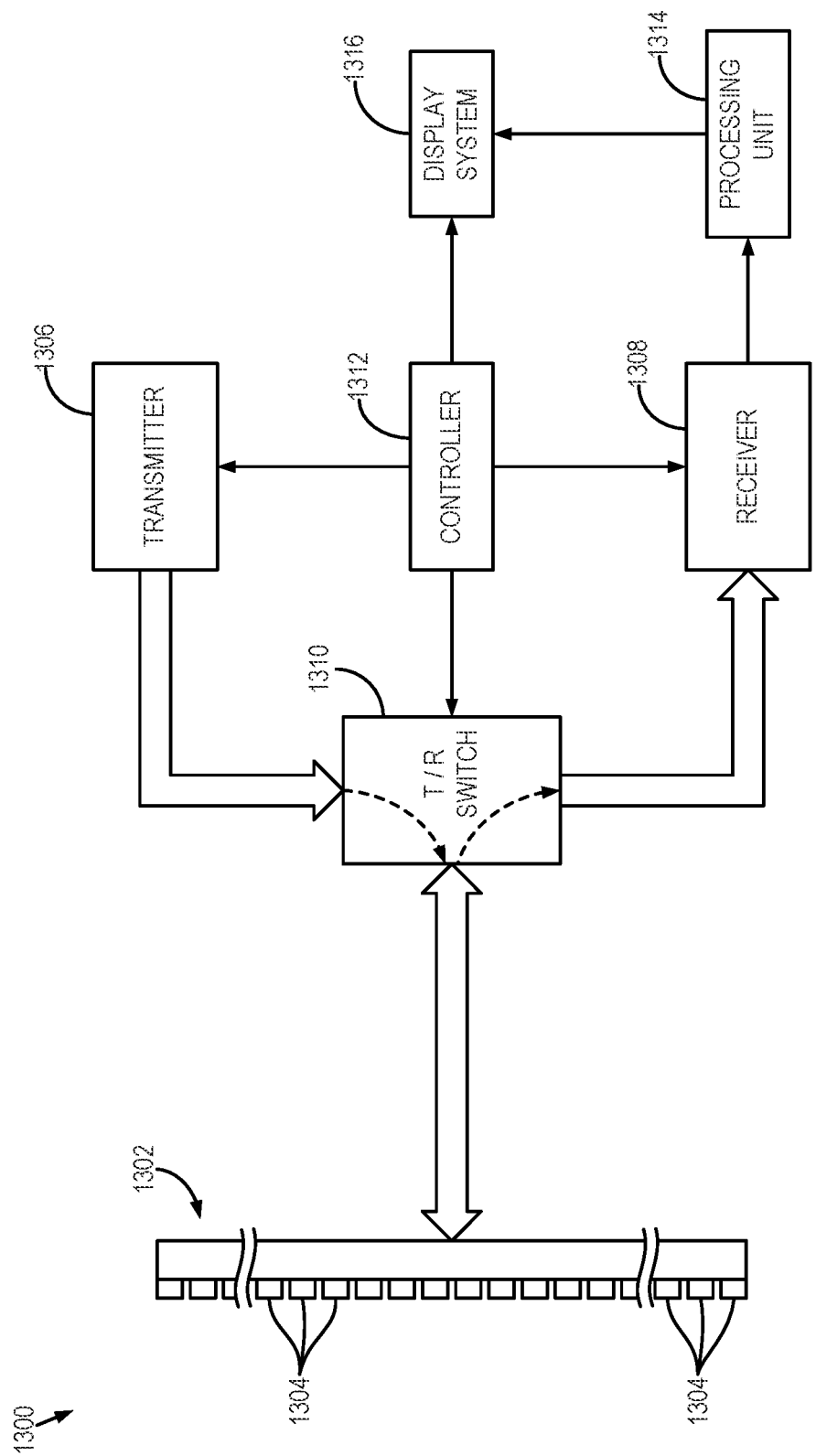
FIG. 13 is a block diagram of an example ultrasound system that can implement the methods described in the present disclosure.

FIG. 13 illustrates an example of an ultrasound system 1300 that can implement the methods described in the present disclosure. The ultrasound system 1300 includes a transducer array 1302 that includes a plurality of separately driven transducer elements 1304. The transducer array 1302 can include any suitable ultrasound transducer array, including linear arrays, curved arrays, phased arrays, and so on. Similarly, the transducer array 1302 can include a 1D transducer, a 1.5D transducer, a 1.75D transducer, a 2D transducer, a 3D transducer, and so on.

When energized by a transmitter 1306, a given transducer element 1304 produces a burst of ultrasonic energy. The ultrasonic energy reflected back to the transducer array 1302 (e.g., an echo) from the object or subject under study is converted to an electrical signal (e.g., an echo signal) by each transducer element 1304 and can be applied separately to a receiver 1308 through a set of switches 1310. The transmitter 1306, receiver 1308, and switches 1310 are operated under the control of a controller 1312, which may include one or more processors. As one example, the controller 1312 can include a computer system.

The transmitter 1306 can be programmed to transmit unfocused or focused ultrasound waves. In some configurations, the transmitter 1306 can also be programmed to transmit diverged waves, spherical waves, cylindrical waves, plane waves, or combinations thereof. Furthermore, the transmitter 1306 can be programmed to transmit spatially or temporally encoded pulses.

The receiver 1308 can be programmed to implement a suitable detection sequence for the imaging task at hand. In some embodiments, the detection sequence can include one or more of line-by-line scanning, compounding plane wave imaging, synthetic aperture imaging, and compounding diverging beam imaging.

In some configurations, the transmitter 1306 and the receiver 1308 can be programmed to implement a high frame rate. For instance, a frame rate associated with an acquisition pulse repetition frequency ("PRF") of at least 100 Hz can be implemented. In some configurations, the ultrasound system 1300 can sample and store at least one hundred ensembles of echo signals in the temporal direction.

A scan can be performed by setting the switches 1310 to their transmit position, thereby directing the transmitter 1306 to be turned on momentarily to energize transducer elements 1304 during a single transmission event according to a selected imaging sequence. The switches 1310 can then be set to their receive position and the subsequent echo signals produced by the transducer elements 1304 in response to one or more detected echoes are measured and applied to the receiver 1308. The separate echo signals from the transducer elements 1304 can be combined in the receiver 1308 to produce a single echo signal.

The echo signals are communicated to a processing unit 1314, which may be implemented by a hardware processor and memory, to process echo signals or images generated from echo signals. As an example, the processing unit 1314 can generate images using the methods described in the present disclosure. Images produced from the echo signals by the processing unit 1314 can be displayed on a display system 1316.

Figure 14:
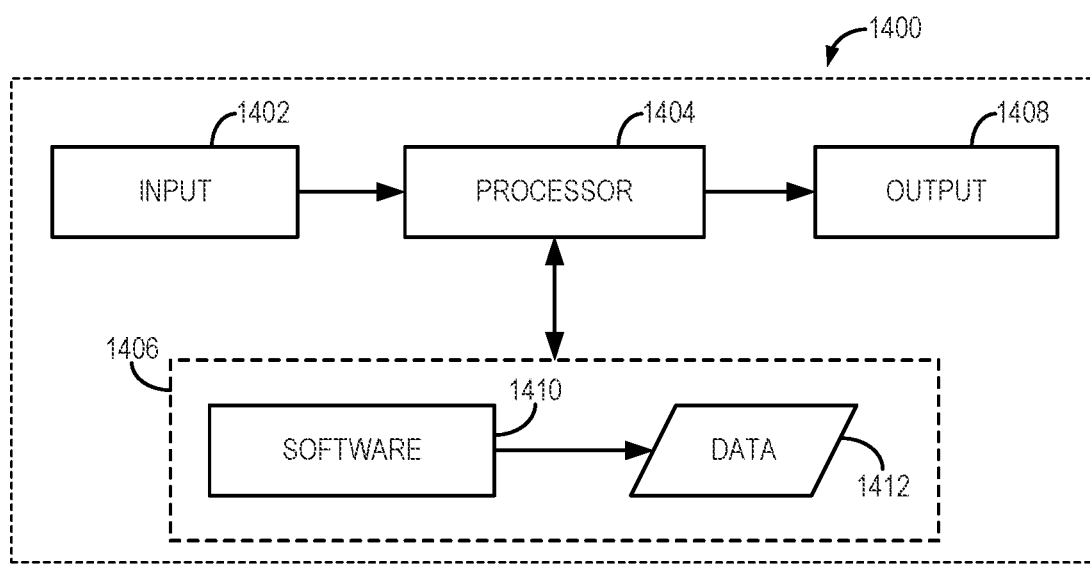
FIG. 14 is a block diagram of an example computer system that can implement embodiments described in the present disclosure.

Referring now to FIG. 14, a block diagram of an example of a computer system 1400 that can perform the methods described in the present disclosure is shown. The computer system 1400 generally includes an input 1402, at least one hardware processor 1404, a memory 1406, and an output 1408. Thus, the computer system 1400 is generally implemented with a hardware processor 1404 and a memory 1406.

In some embodiments, the computer system 1400 can be a controller or processing unit of an ultrasound system. The computer system 1400 may also be implemented, in some examples, by a workstation, a notebook computer, a tablet device, a mobile device, a multimedia device, a network server, a mainframe, one or more controllers, one or more microcontrollers, or any other general-purpose or application-specific computing device.

The computer system 1400 may operate autonomously or semi-autonomously, or may read executable software instructions from the memory 1406 or a computer-readable medium (e.g., a hard drive, a CD-ROM, flash memory), or may receive instructions via the input 1402 from a user, or any another source logically connected to a computer or device, such as another networked computer or server. Thus, in some embodiments, the computer system 1400 can also include any suitable device for reading computer-readable storage media.

In general, the computer system 1400 is programmed or otherwise configured to implement the methods and algorithms described in the present disclosure. For instance, the computer system 1400 can be programmed to generate images according to the methods described in the present disclosure.

The input 1402 may take any suitable shape or form, as desired, for operation of the computer system 1400, including the ability for selecting, entering, or otherwise specifying parameters consistent with performing tasks, processing data, or operating the computer system 1400. In some aspects, the input 1402 may be configured to receive data, such as data acquired with an ultrasound system. Such data may be processed as described above to generate images. In addition, the input 1402 may also be configured to receive any other data or information considered useful for generating images using the methods described above.

Among the processing tasks for operating the computer system 1400, the one or more hardware processors 1404 may also be configured to carry out any number of post-processing steps on data received by way of the input 1402.

The memory 1406 may contain software 1410 and data 1412, such as data acquired with an ultrasound system, and may be configured for storage and retrieval of processed information, instructions, and data to be processed by the one or more hardware processors 1404. In some aspects, the software 1410 may contain instructions directed to generating images according to embodiments described in the present disclosure.

In addition, the output 1408 may take any shape or form, as desired, and may be configured for displaying images (e.g., microvessel images), in addition to other desired information.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (e.g., hard disks, floppy disks), optical media (e.g., compact discs, digital video discs, Blu-ray discs), semiconductor media (e.g., random access memory ("RAM"), flash memory, electrically programmable read only memory ("EPROM"), electrically erasable programmable read only memory ("EEPROM")), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

The present disclosure has described one or more preferred embodiments, and it should be appreciated that many equivalents, alternatives, variations, and modifications, aside from those expressly stated, are possible and within the scope of the invention.

The invention claimed is:

1. A method for high-spatial and temporal resolution imaging of microvessels using an ultrasound system, the steps of the method comprising:
   (a) accessing ultrasound data with a computer system, the ultrasound data having been acquired with the ultrasound system from a region-of-interest in a subject in which a microbubble contrast agent was present when the ultrasound data were acquired;
   (b) generating microbubble signal data with the computer system by separating microbubble signals in the ultrasound data from other signals in the ultrasound data;
   (c) determining a point spread function (PSF) for the ultrasound system used to acquire the ultrasound data;
   (d) determining a first Nth power of the microbubble signal data and a second Nth power of the PSF to generate a cross-correlation map between the microbubble signal data and the point spread function of the ultrasound system;
   (e) producing a high spatial and temporal resolution microvessel image based at least in part on the generated cross-correlation map.

2. The method as recited in claim 1, wherein N is greater than 2.

3. The method as recited in claim 1, wherein the first Nth power and the second Nth power are equal.

4. The method as recited in claim 3, wherein the first Nth power of the microbubble signal data and the second Nth power of the PSF determine the sharpness of the microvessel image.

5. The method as recited in claim 3, wherein the microbubble signal data and the PSF include Gaussian profiles, and wherein the first Nth power of the microbubble signal data and the second Nth power of the PSF provide a sharper Gaussian profile and a smaller full width at half maximum (FWHM) compared to the microbubble signal data.

6. The method as recited in claim 5, wherein the FWHM is improved by a factor of $1/\sqrt{N}$.

7. The method as recited in claim 1, wherein the PSF is a simulated PSF.

8. The method as recited in claim 7, wherein the simulated PSF is simulated based at least in part on a multivariate Gaussian distribution.

9. The method as recited in claim 1, wherein the PSF is estimated based on measurements obtained by imaging a small point object with the ultrasound system.

10. The method as recited in claim 1, wherein the PSF is determined from an isolated individual microbubble derived from the microbubble signal data.

11. The method as recited in claim 1, further comprising sharpening the cross-correlation map.

12. The method as recited in claim 11, wherein sharpening the cross-correlation map includes applying a threshold to the cross-correlation map to reject correlation coefficient values below the threshold.

13. The method as recited in claim 1, further comprising denoising the cross-correlation map to remove targets in the cross-correlation map.

14. The method as recited in claim 1, further comprising generating a flow hemodynamic image based upon microbubble trajectories in the cross-correlation maps.

15. The method as recited in claim 14, wherein generating the flow hemodynamic image includes estimating a microbubble flow velocity from the microbubble signal data.

16. The method as recited in claim 15, wherein estimating the microbubble flow velocity includes isolating individual microbubble trajectories between frames of the cross-correlation maps.

17. The method as recited in claim 16, further comprising applying a fitting line to the individual microbubble trajectories, and determining at least one of orientation or length of the isolated microbubble trajectories to estimate the microbubble flow velocity.

18. The method as recited in claim 1, further comprising determining a noise floor of the ultrasound system, and using the determined noise floor as a spatially varying threshold to suppress noise in the microbubble signal data.

19. The method as recited in claim 18, wherein the spatially varying threshold is controlled by a scaling factor applied to the noise floor of the ultrasound system.

20. The method as recited in claim 18, wherein the noise floor of the ultrasound system is determined by at least one of: receiving data with an ultrasound transmission of the ultrasound system turned off or filtering received data with the ultrasound transmission minimized.

21. A method for high-spatial and temporal resolution imaging of microvessels using an ultrasound system, the steps of the method comprising:
(a) accessing ultrasound data with a computer system, the ultrasound data having been acquired with the ultrasound system from a region-of-interest in a subject in which a microbubble contrast agent was present when the ultrasound data were acquired;
(b) spatially dividing the ultrasound data with the region-of-interest into a plurality of data subsets;
(c) generating microbubble signal data for each data subset with the computer system by separating microbubble signals in the spatially divided ultrasound data from other signals in the spatially divided ultrasound data;
(d) determining a spatial-dependent point spread function (PSF) for each data subset for the ultrasound system used to acquire the ultrasound data;
(e) determining an Nth power of the microbubble signal data for each data subset and the PSF to generate a cross-correlation map between the ultrasound data of each data subset and the point spread function of the ultrasound system;
(f) producing a high spatial and temporal resolution microvessel image for each data subset based at least in part on the generated cross-correlation map
(g) producing a final high spatial and temporal resolution microvessel image by combining the microvessel images for each data subset.

* * * * *